US011050531B2

(12) United States Patent
Damnjanovic et al.

(10) Patent No.: US 11,050,531 B2
(45) Date of Patent: Jun. 29, 2021

(54) FREQUENCY DIVERSITY WITH CARRIER HOPPING IN UNLICENSED SPECTRUM

(71) Applicant: QUALCOMM Incorporated, San Diego, CA (US)

(72) Inventors: Aleksandar Damnjanovic, Del Mar, CA (US); Srinivas Yerramalli, San Diego, CA (US); Tamer Kadous, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/394,518

(22) Filed: Apr. 25, 2019

(65) Prior Publication Data

US 2019/0334666 A1    Oct. 31, 2019

Related U.S. Application Data

(60) Provisional application No. 62/663,759, filed on Apr. 27, 2018.

(51) Int. Cl.
*H04L 5/00* (2006.01)
*H04W 16/14* (2009.01)
(Continued)

(52) U.S. Cl.
CPC .......... *H04L 5/0012* (2013.01); *H04L 5/0094* (2013.01); *H04W 16/14* (2013.01);
(Continued)

(58) Field of Classification Search
CPC . H04W 48/12; H04W 16/14; H04W 72/0453; H04W 48/08; H04W 74/006;
(Continued)

(56) References Cited

U.S. PATENT DOCUMENTS

2016/0029384 A1*  1/2016  Sidhu ............... H04W 72/0453
                                                          370/329
2016/0249222 A1*  8/2016  Li ......................... H04W 16/14
(Continued)

OTHER PUBLICATIONS

HTC: "Dynamic Carrier Selection for LAA", 3GPP Draft; R1-164905 Dynamic Carrier Selection for LAA, 3rd Generation Partnership Project (3GPP), Mobile Competence Centre, 650, Route Des Lucioles; F-06921 Sophia-Antipolis Cedex, France, vol. RAN WG1, No. Nanjing, China; May 23, 2016-May 27, 2016, May 13, 2016, (May 13, 2016), pp. 1-2, XP051096829, Retrieved from the Internet: URL: http://www.3gpp.org/ftp/tsg_ran/WG1_RL1/TSGR1_85/ Docs/ [retrieved on May 13, 2016], Section 2.
(Continued)

*Primary Examiner* — Mehmood B. Khan
(74) *Attorney, Agent, or Firm* — Liem T. Do

(57) ABSTRACT

Wireless communications systems and methods related to providing frequency diversity for communications in an unlicensed spectrum are provided. A first wireless communication device communicates, with a second wireless communication device, an opportunistic frequency-switching configuration for a first frequency band and a second frequency band. The first frequency band and the second frequency band are shared by a first network operating entity and a second network operating entity. The first wireless communication device communicates, with the second wireless communication device, a first communication signal in a first frequency band based on the opportunistic frequency-switching configuration. The first wireless communication device switches from the first frequency band to a second frequency band based on the opportunistic frequency-switching configuration. The first wireless communication device communicates, with the second wireless communication device after the switching, a second communication
(Continued)

signal in the second frequency band based on the opportunistic frequency-switching configuration.

26 Claims, 10 Drawing Sheets

(51) Int. Cl.
H04W 74/08 (2009.01)
H04W 74/00 (2009.01)
H04W 72/14 (2009.01)
H04W 48/08 (2009.01)

(52) U.S. Cl.
CPC ........... *H04W 48/08* (2013.01); *H04W 72/14* (2013.01); *H04W 74/006* (2013.01); *H04W 74/0808* (2013.01)

(58) Field of Classification Search
CPC ............. H04W 74/0808; H04W 72/14; H04W 72/042; H04L 5/001; H04L 5/0096; H04L 5/0012; H04L 5/0094; H04L 27/0006; H04L 5/1469
See application file for complete search history.

(56) References Cited

U.S. PATENT DOCUMENTS

| | | | |
|---|---|---|---|
| 2017/0048041 A1* | 2/2017 | Yi | H04L 5/0048 |
| 2019/0045544 A1* | 2/2019 | Wang | H04L 27/2602 |
| 2019/0124664 A1* | 4/2019 | Wang | H04W 74/02 |
| 2019/0223067 A1* | 7/2019 | Bahr | H04W 72/0453 |
| 2019/0280733 A1* | 9/2019 | Li | H04W 72/0453 |

OTHER PUBLICATIONS

Huawei., et al., "UE Support of Carrier Selection for LAA", 3GPP Draft; R1-155068, 3rd Generation Partnership Project (3GPP), Mobile Competence Centre, 650, Route Des Lucioles; F-06921 Sophia-Antipolis Cedex, France, vol. RAN WG1, No. Malmo, Sweden; Oct. 5, 2015-Oct. 9, 2015, Oct. 4, 2015 (Oct. 4, 2015), 7 Pages, XP051002062, Retrieved from the Internet: URL: http://www.3gpp.org/ftp/Meetings_3GPP_SYNC/RAN2/Docs/ [retrieved on Oct. 4, 2015], Section 4.

Institute for Information Industry (III): "Solutions to DL LAA Hidden Node and Channel Reuse", 3GPP Draft; R1-150420 Solutions to DL LAA Hidden Node and Channel Reuse, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 9, 2015-Feb. 13, 2015, Jan. 30, 2015 (Jan. 30, 2015), pp. 1-6, XP050948647, Retrieved from the Internet: URL: http://www.3gpp.org/ftp/tsg_ran/WG1_RL1/TSGR1_80/Docs/ [retrieved on Jan. 30, 2015].

International Search Report and Written Opinion—PCT/US2019/029346—ISA/EPO—dated Jun. 19, 2019.

Kyocera, "Further Considerations on the Essential Functionalities for LAA," 3GPP Draft; R1-144955, 3rd Generation Partnership Project (3GPP), Mobile Competence Centre; 650, Route Des Lucioles; F-06921 Sophia-Anti Polis Cedex; France, vol. RAN WG1, No. San Francisco, Nov. 17, 2014-Nov. 21, 2014, Nov. 8, 2014, XP050895108, Retrieved from the Internet: http://www.3gpp.org/ftp/tsg_ran/WG1_RL1/TSGR1_79/Docs/R1-144955.zip [Accessed Oct. 27, 2017], 10 pages, Section 3.2.

* cited by examiner

FREQUENCY DIVERSITY WITH CARRIER HOPPING IN UNLICENSED SPECTRUM

CROSS REFERENCE TO RELATED APPLICATIONS

The present application claims priority to and the benefit of U.S. Provisional Patent Application No. 62/663,759, filed Apr. 27, 2018, which is hereby incorporated by reference in its entirety as if fully set forth below and for all applicable purposes.

TECHNICAL FIELD

This application relates to wireless communication systems, and more particularly to providing frequency diversity for communications in an unlicensed spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

An approach to sharing a communication medium or spectrum among network operating entities is to employ a listen-before-talk (LBT) procedure to ensure a particular channel is clear before transmitting a message. One challenge in wireless communication systems that utilize unlicensed spectrum is cell-edge performance. For example, a BS may provide communication coverage over an area of a cell. Two UEs served by the BS may each perform an LBT prior to transmitting a signal to the BS. When the UEs are located at opposite edges of the cell, the UEs may be out of each other's range, and thus may not detect each other's transmissions. As such, both UEs may proceed to transmit a signal to the BS at the same time, interfering or colliding with each other at the BS's receiver. The interference or collision caused by out-of-range transmitters may be referred to as hidden-node interference. The hidden-node interference can cause an outage (e.g., communication failure) event in the network.

While some studies and/or standards, such as Institute of Electrical and Electronics Engineers (IEEE) 802.11-2016 standards, may define various request-to-send/clear-to-send (RTS/CTS) schemes to reduce the occurrences of hidden-node interference, the schemes can be complex and may be designed to operate with a specific wireless communication technology and/or a specific deployment scenario.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication comprising communicating, by a first wireless communication device with a second wireless communication device, an opportunistic frequency-switching configuration for a first frequency band and a second frequency band, the first frequency band and the second frequency band shared by a first network operating entity and a second network operating entity; and communicating, by the first wireless communication device with the second wireless communication device, a communication signal based on the opportunistic frequency-switching configuration.

In an additional aspect of the disclosure, a method of wireless communication comprising communicating, by a first wireless communication device with a second wireless communication device, a first communication signal in a first frequency band during a first period based on an opportunistic frequency-switching configuration; switching, by the first wireless communication device, from the first frequency band to a second frequency band based on the opportunistic frequency-switching configuration, wherein the first frequency band and the second frequency band are shared by a first network operating entity and a second network operating entity; and communicating, by the first wireless communication device with the second wireless communication device after the switching, a second communication signal in the second frequency band during a second period based on the opportunistic frequency-switching configuration.

In an additional aspect of the disclosure, an apparatus comprising a transceiver configured to communicate, with a wireless communication device, an opportunistic frequency-switching configuration for a first frequency band and a second frequency band, the first frequency band and the second frequency band shared by a first network operating entity and a second network operating entity; and communicate, with the wireless communication device, a communication signal based on the opportunistic frequency-switching configuration.

In an additional aspect of the disclosure, an apparatus comprising a transceiver configured to communicate, with a wireless communication device, a first communication signal in a first frequency band during a first period based on an opportunistic frequency-switching configuration; switch from the first frequency band to a second frequency band based on the opportunistic frequency-switching configuration, wherein the first frequency band and the second frequency band are shared by a first network operating entity and a second network operating entity; and communicate, with the wireless communication device after the switching, a second communication signal in the second frequency band during a second period based on the opportunistic frequency-switching configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
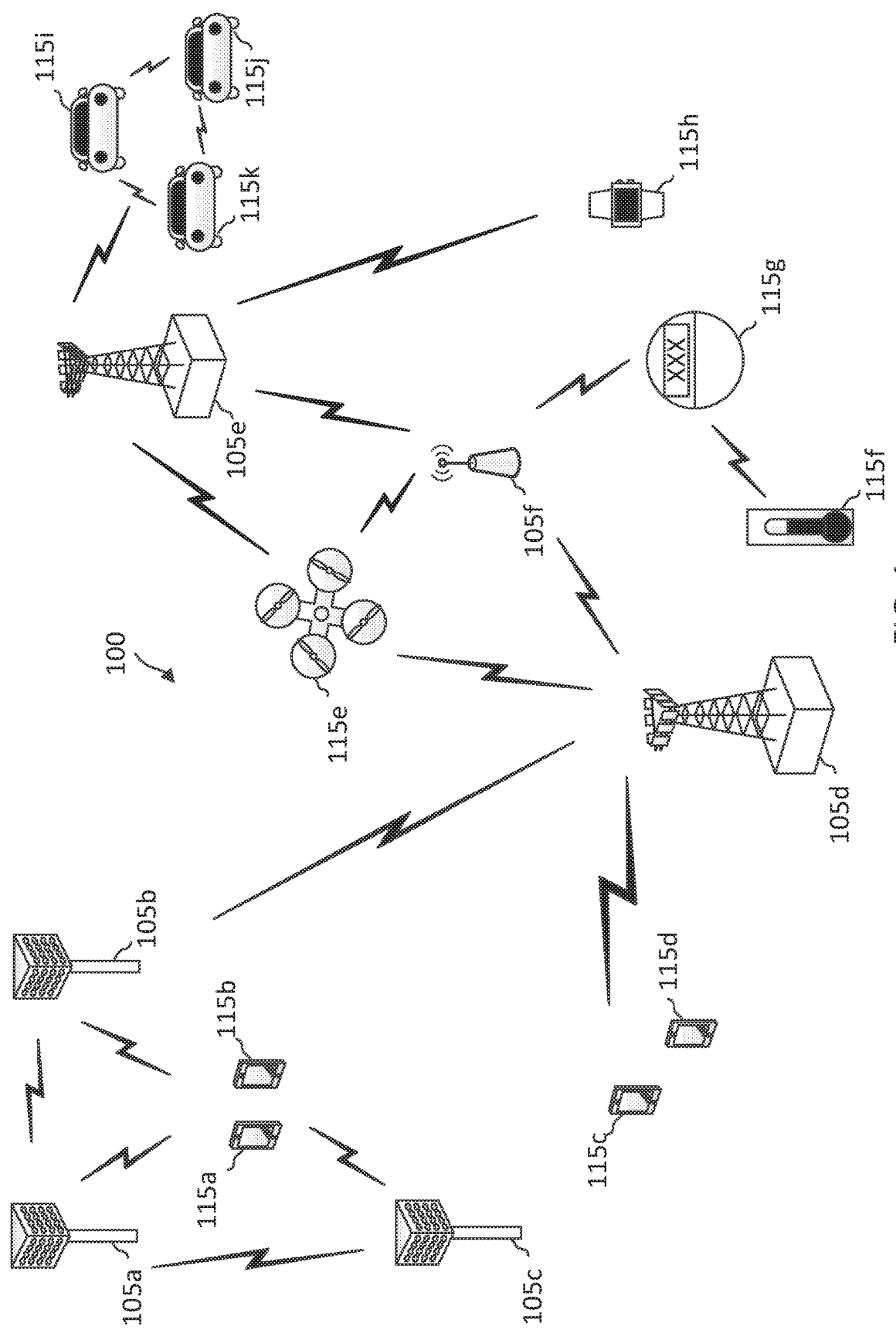
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for providing frequency diversity in an unlicensed spectrum by associating multiple unlicensed frequency carriers for communications. For example, a BS may associate or link a first component carrier (e.g., a first frequency band) with a second component carrier (e.g., a second frequency band) in an unlicensed spectrum for communications. The BS may broadcast first system information in the first frequency band to facilitate communications in the first frequency band. The BS may broadcast second system information in the second frequency band to facilitate communications in the second frequency band. The BS may indicate the association or the link between the first frequency band and the second frequency band and a frequency-hopping or carrier-switching pattern to facilitate channel monitoring and communications in the first frequency band and the second frequency band. The switching between the carriers or frequency bands may be performed opportunistically based on needs.

In an embodiment, the first system information may include synchronization signal blocks (SSB) and/or remaining system information (RMSI) corresponding to the first frequency band and/or the cell served by the BS. The second system information may include SSB and/or RMSI corresponding to the second frequency band and/or the cell served by the BS. A UE may perform a random access procedure, a network attachment procedure, and/or a paging procedure using the first frequency band based on the first system information and/or using the second frequency band based on the second system information.

In an embodiment, the opportunistic frequency-switching pattern may indicate a first set of channel monitoring periods in the first frequency band and a second set of channel monitoring periods in the second frequency band. The first set of channel monitoring periods can be non-overlapping and interleaving with the second set of channel monitoring periods in time. The BS may transmit a scheduling grant in a channel monitoring period of the first frequency band or in a channel monitoring period of the second frequency band. The UE may monitor for a scheduling grant from the BS during the first set of channel monitoring periods and/or during the second set of channel monitoring periods. In other words, the UE may switch or hop between the first frequency band and the second frequency band for the monitoring. If the UE detects a scheduling grant in one of the first or second frequency band, the UE may proceed to communicate with the BS in a corresponding frequency band based on the scheduling grant. Otherwise, the UE may switch or hop to the other frequency band and continue with the monitoring.

In some embodiments, the BS may communicate with the UE using one frequency band and may activate the frequency-switching based on channel qualities. For example, when the UE is located at a cell-edge, the channel quality of one frequency band may be higher than another frequency band. Thus, the BS may switch to use the frequency band with the higher channel quality for communications with the UE. As such, the disclosed embodiments can improve cell-edge performance. While the disclosed embodiments are illustrated using two unlicensed or share frequency bands or carriers, the disclosed embodiments can be applied to any suitable number of unlicensed or shared frequency carriers, for example, about three, four, or five or more.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. The BSs 105 and the UEs 115 may communicate over the shared channel by performing LBT procedures. For example, after a BS 105 gain access or a transmission opportunity (TXOP) in the shared channel, the BS 105 may schedule a UE 115 for a UL transmission or a DL transmission in a certain time period (e.g., a transmission slot within the TXOP). When the schedule is for a UL transmission, the UE 115 may additionally perform an LBT procedure prior to the scheduled time period. When the LBT is successful or the channel is clear, the UE 115 may transmit a UL communication signal, such as a PUSCH signal or a PUCCH signal, to the BS 105.

In some embodiments, the operations can be compliant to European Telecommunications Standards Institute (ETSI) document EN 301 893. Thus, the network 100 can operate over frequency bands around 5 GHz.

In some embodiments, the network 100 may provide frequency diversity by operating over multiple unlicensed or shared frequency bands. The multiple frequency bands may be associated with each other for communications in the network 100. For example, a BS 105 may broadcast first system information in a first frequency band and may broadcast second system information in a second frequency band. The first system information and the second system information can include SSBs, RMSI, and/or OSI. The BS 105 may signal an association between the first frequency band and the second frequency band. A UE 115 may monitor for system information in the first frequency band and/or the second frequency band and receive the association. The UE 115 may perform cell selection and/or network registration over the first frequency band and/or the second frequency band. The UE 115 may camp on both the first frequency band and the second frequency band. The BS 105 and the UE 115 may communicate with each other by switching between the first frequency band and the second frequency band to provide the frequency diversity. For example, the UE 115 may fail to communicate with the BS 105 over one of the first frequency band or the second frequency band at some time instants, but may be able to continue to communicate with the BS 105 over the other frequency band. Thus, the frequency switching can reduce network outage events, for example, caused by hidden-node interference. Mechanisms for communicating over multiple linked or associated frequency bands with frequency-switching are described in greater detail herein.

Figure 2:
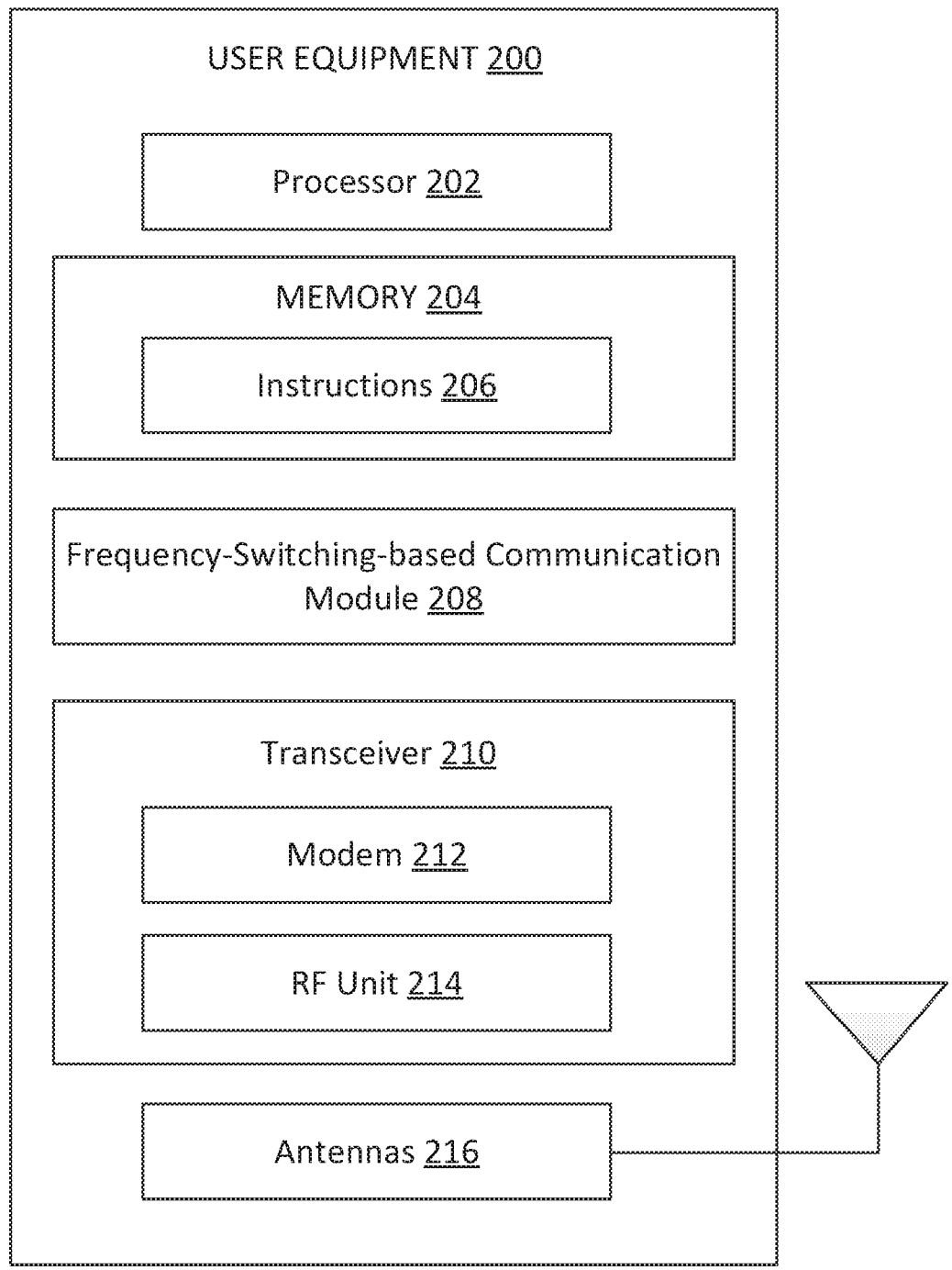
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above in FIG. 1. As shown, the UE 200 may include a processor 202, a memory 204, a frequency-switching-based communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure, for example, aspects of FIGS. 4-10. Instructions 206 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The frequency-switching-based communication module 208 may be implemented via hardware, software, or combinations thereof. For example, the frequency-switching-based communication module 208 may be implemented as a processor, circuit, and/or instructions 206 stored in the memory 204 and executed by the processor 202. The frequency-switching-based communication module 208 may be used for various aspects of the present disclosure, for example, aspects of FIGS. 4-10. The frequency-switching-based communication module 208 is configured to monitor for system information (e.g., SSBs, RMSI, and/or OSI) from a BS (e.g., the BSs 105) in multiple unlicensed and/or shared frequency bands, receive association information for the multiple frequency bands from the BS, perform cell selection procedures, network attachment or registration procedures, and/or cell camping procedures based on system information obtained from the monitoring and/or the received frequency band association information, obtain frequency-switching configuration information from the system information, performs LBT procedures, and/or communicate with the BS based on the association information, the frequency-switching configuration information, and/or LBT results, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the frequency-switching-based communication module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
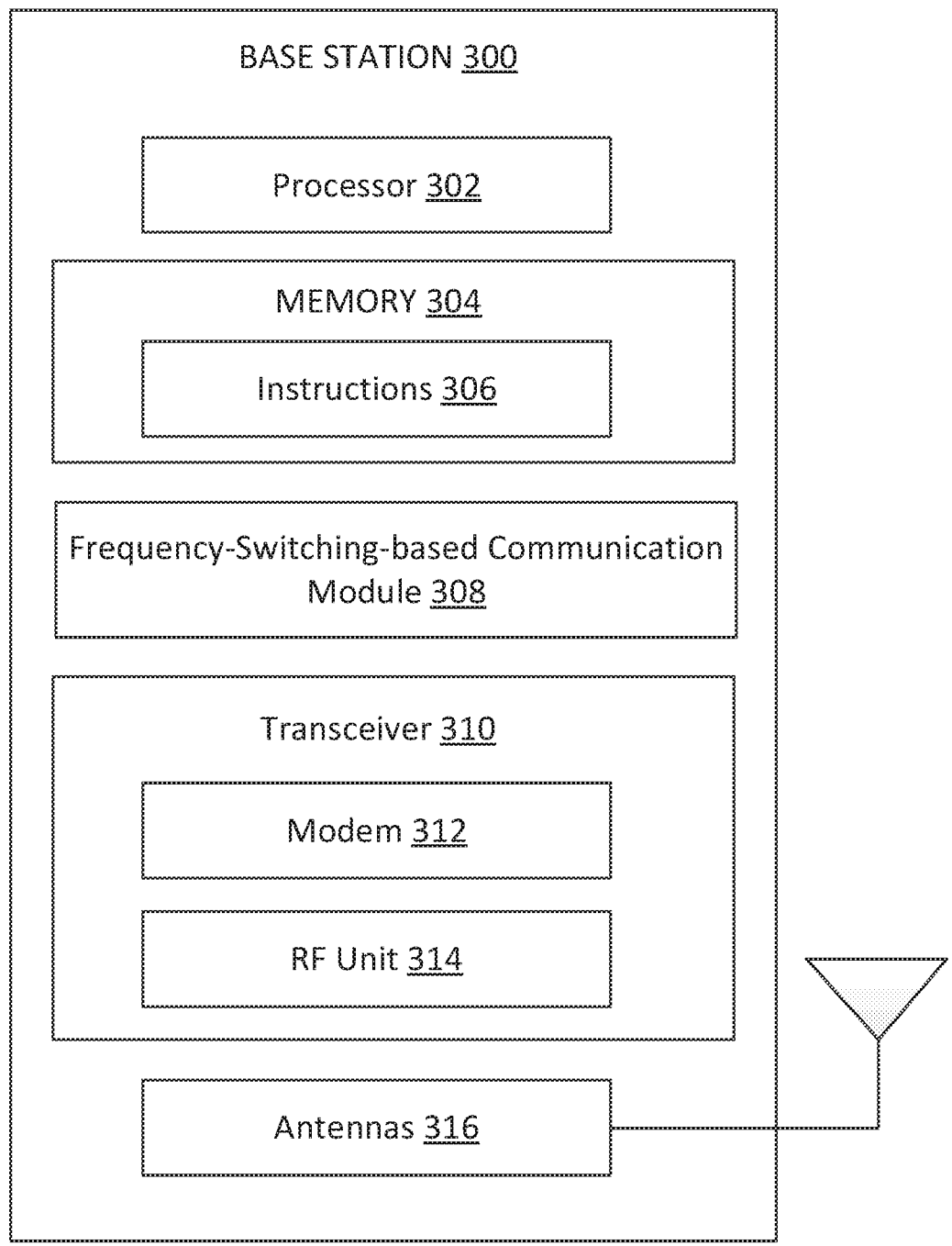
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above in FIG. 1. As shown, the BS 300 may include a processor 302, a memory 304, a frequency-switching-based communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein, for example, aspects of FIGS. 4-10. Instructions 306 may also be referred to as code, which may be interpreted broadly to include any type of computer-readable statement(s) as discussed above with respect to FIG. 2.

The frequency-switching-based communication module 308 may be implemented via hardware, software, or combinations thereof. For example, the frequency-switching-based communication module 308 may be implemented as a processor, circuit, and/or instructions 306 stored in the memory 304 and executed by the processor 302. The frequency-switching-based communication module 308 may be used for various aspects of the present disclosure, for example, aspects of FIGS. 4-10. The frequency-switching-based communication module 308 is configured to broadcast system information (e.g., SSBs, RMSI, and/or OSI) over multiple unlicensed or shared frequency bands, provide association information and/or frequency-switching configuration information for the multiple frequency bands, perform random access procedures with UEs (e.g., the UEs 115) based on the system information, coordinate with various network entities to identify, authenticate, and/or authorize UEs for network attachments or network registrations, perform paging based on the system information, perform LBT procedures, and/or communicate with the UEs based on the association information, the frequency-switching configuration information, and/or LBT results, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
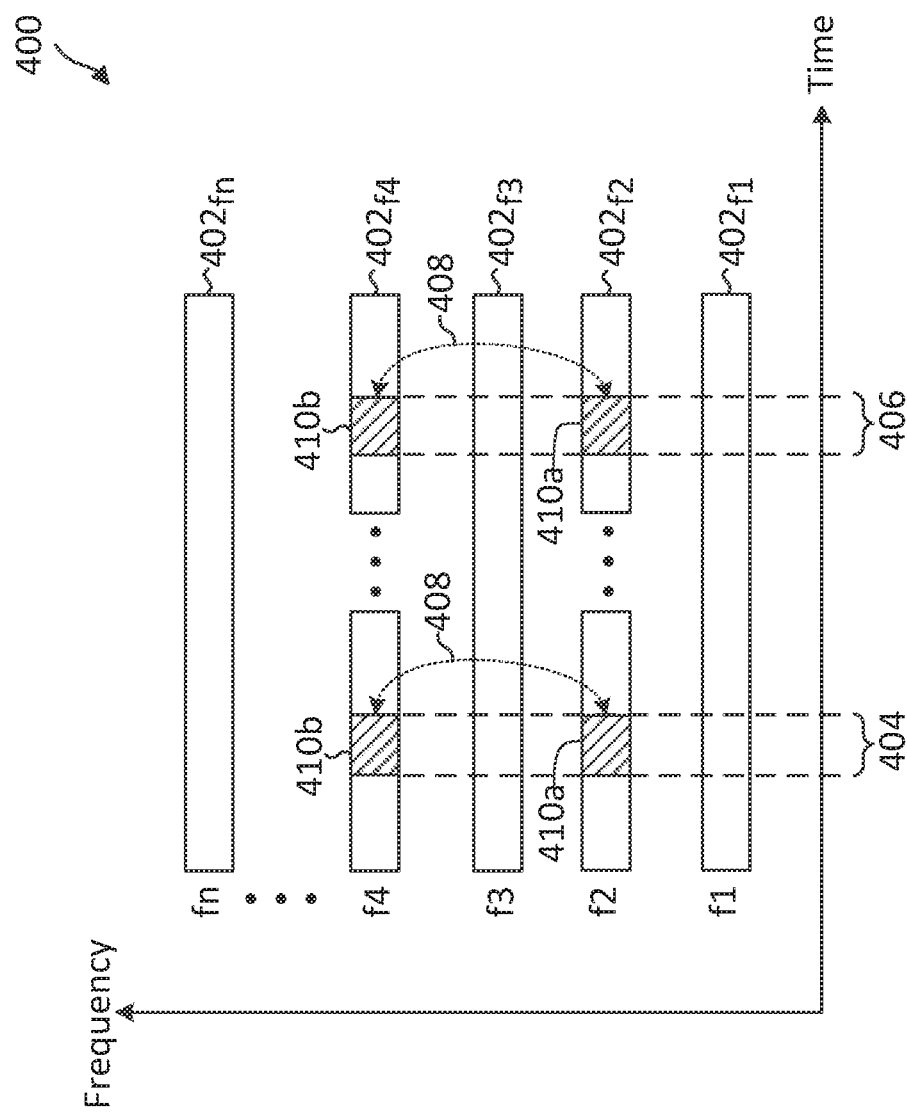
FIG. 4 illustrates a broadcast system information transmission scheme according to some embodiments of the present disclosure.
Figure 5:
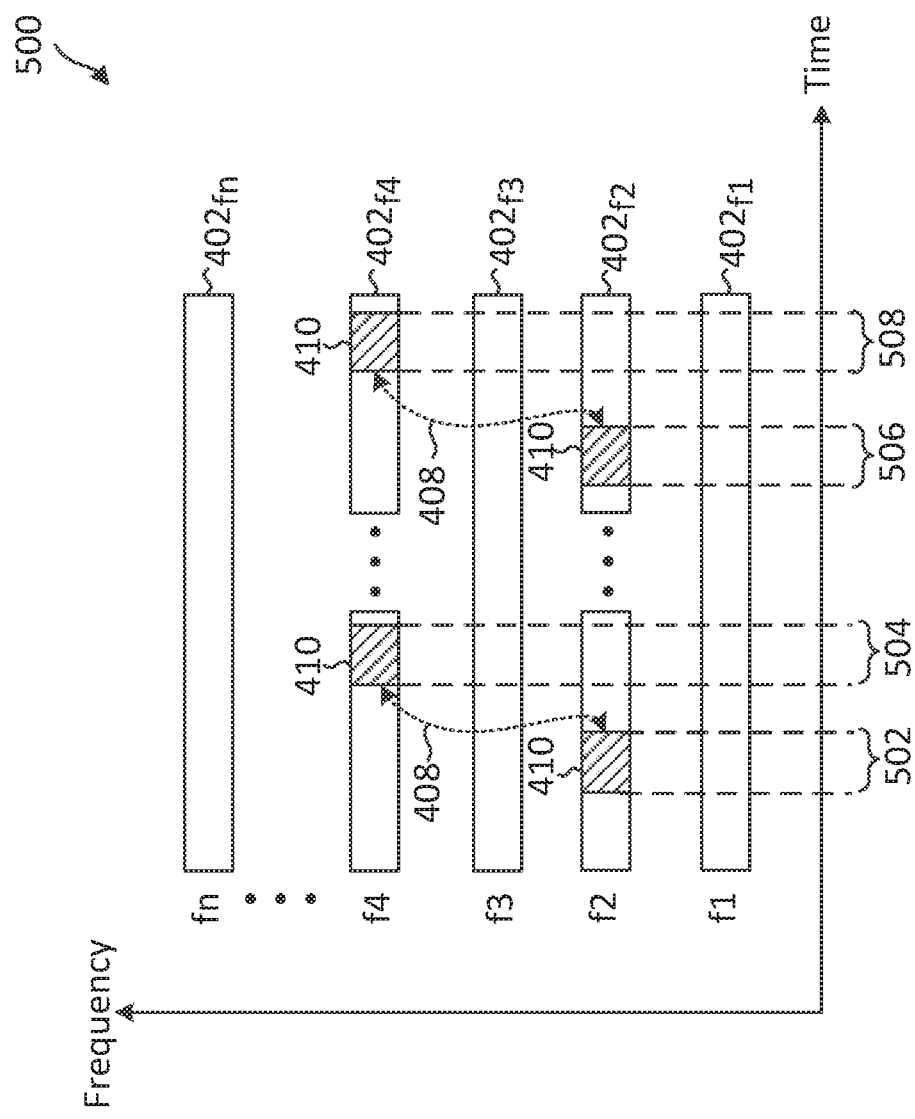
FIG. 5 illustrates a broadcast system information transmission scheme according to some embodiments of the present disclosure.

FIGS. 4-5 illustrate mechanisms for providing network system information over multiple unlicensed and/or shared frequency carriers. In FIGS. 4-5, the x-axes represent time in some constant units, and the y-axes represent frequency in some constant units.

FIG. 4 illustrates a broadcast system information transmission scheme 400 according to some embodiments of the present disclosure. The scheme 400 may be employed by a BS such as the BSs 105 and 300 and a UE such as the UEs 115 and 200 in a network such as the network 100. The scheme 400 includes a plurality of frequency bands 402 at frequencies f1 to fn. The frequency bands 402 are shown as $402_{f1}$ to $402_{fn}$. The frequency bands 402 may include unlicensed and/or shared frequency bands. In the scheme 400, a BS (e.g., BS 105 in FIG. 1) may provide communications to UEs (e.g., UEs 115 in FIG. 1) in a coverage area using multiple frequency bands 402. For purposes of simplicity of discussion, the scheme 400 illustrates a BS providing communications over two frequency bands $402_{f2}$ and $402_{f4}$, though it will be recognized that embodiments of the present disclosure may scale to include any suitable number frequency bands 402 (e.g., about 3, 4, 5 or more) for communications between a BS and a UE.

To facilitate initial network access procedures and communications in the frequency bands $402_{f2}$ and $402_{f4}$, the BS transmits system information 410a in the frequency band $402_{f2}$ and system information 410b in the frequency band $402_{f4}$. The BS may transmit the system information 410a in the frequency band $402_{f2}$ in concurrent with system information 410b in the frequency band $402_{f4}$ during a time interval 404. The BS can transmit the system information 410a and 410b periodically in the frequency bands $402_{f2}$ and $402_{f4}$, respectively, for example, repeating the transmissions during a time interval 406.

In some embodiments, the BS may perform an LBT in the frequency bands $402_{f2}$ and $402_{f4}$ prior to the transmissions of the system information 410 and the system information 410b. When the LBT is successful, the BS may transmit the system information 410a in the frequency band $402_{f2}$ and the system information 410b in the frequency band $402_{f4}$.

The system information 410 can include SSBs and/or RMSI. The system information 410a may include information for communicating in the frequency band $402_{f2}$. For example, the system information 410a may include OSI scheduling information, a random access configuration, and/or a paging configuration for the frequency band $402_{f2}$. The random access configuration can include random access preamble format configurations and/or random access resources in the frequency band $402_{f2}$. The paging configuration can include paging occasions and/or paging resources in the frequency band $402_{f2}$. The system information 410b may be substantially similar to the system information 410a, but may include information for communicating in the frequency band $402_{f4}$. In some instances, the system information 410a and the system information 410b can carry some identical information, for example, information that is cell-specific, such as PSSs and SSSs.

In the scheme 400, the frequency bands $402_{f2}$ and $402_{f4}$ are linked or associated for communications to provide frequency diversity. The BS may indicate an association between the frequency bands $402_{f2}$ and $402_{f4}$. The association can be semi-static via links or referenced in the system information 410a and/or 410b. For example, the system information 410a in the frequency band $402_{f2}$ may include a pointer or a link 408 (e.g., a virtual link or a soft link) indicating the presence of the system information 410b in the frequency band $402_{f4}$. The system information 410b in the frequency band $402_{f4}$ may alternatively or additionally include a pointer or a link indicating the presence of the system information 410a in the frequency band $402_{f2}$.

In some embodiments, the BS can use more than two frequency bands 402 for communications to provide further frequency diversity. In such embodiments, the BS may configure the associations or links among the frequency bands 402 in a sequential order. For example, the BS may use four frequency bands $402_{f2}$, $402_{f4}$, $402_{f3}$, and $402_{f1}$ for communications. The BS may link the frequency bands $402_{f2}$, $402_{f4}$, $402_{f3}$, and $402_{f1}$ in a sequential order. In other words, the system information 410b may further include a link pointing to the next frequency band $402_{f3}$ in the sequence. Similarly, system information 410 in the frequency band $402_{f3}$ may include a link pointing to the next frequency band $402_{f1}$ in the sequence. In some embodiments, the system information 410 in each frequency band 402 may additionally include a reverse link pointing to a frequency band 402 in the sequence in a reverse order.

In some embodiments, the BS may indicate the association between the frequency bands $402_{f2}$ and $402_{f4}$ using dedicated RRC signaling (e.g., via RRC messages). Alternatively, the BS may indicate the association dynamically via DCI in a PDCCH or a medium access control control element (MAC CE) message. In some instances, the RRC, DCI, or MAC CE message can be UE-specific. In other words, the BS may link certain frequency bands 402 for communications with the particular UE. In some instances, the message can include timer information associated with transmissions of system information 410 over the other frequency band 402.

A UE (e.g., UE 115 in FIG. 1) may monitor the frequency bands 402 for system information 410 from the BS. The UE may detect the system information 410a in the frequency band $402_{f2}$ and/or the system information 410b in the frequency band $402_{f4}$. After receiving the system information 410a and/or 410b, the UE may perform a cell selection procedure, a random access procedure, a network attachment procedure, and/or a paging procedure with the BS over the frequency band $402_{f2}$ and/or the frequency band $402_{f4}$ based on the received system information 410a and/or 410b. In some instances, the UE may camp on both the frequency band $402_{f2}$ and the frequency band $402_{f4}$. In other words, the network and/or the BS may associate the UE with both the frequency band $402_{f2}$ and the frequency band $402_{f4}$.

In some embodiments, the system information $410a$ and/or the system information $410b$ may include a frequency-switching configuration or pattern for communications using the frequency band $402_{f2}$ and the frequency band $402_{f4}$. The frequency-switching pattern can indicate time periods for monitoring the frequency band $402_{f2}$ and time periods for monitoring for monitoring the frequency band $402_{f4}$. The monitoring can include scheduling information monitoring and/or preamble monitoring (e.g., related medium reservations), as described in greater detail herein.

In some embodiments, the BS may use the frequency band $402_{f2}$ as a primary frequency band for communications with a UE and may use the frequency band $402_{f4}$ as a backup frequency band or a secondary frequency band for communications with the UE, for example, when a failure or an outage is detected in the frequency band $402_{f2}$. For example, when the channel quality in the frequency band $402_{f2}$ is sufficiently good and reliable, the BS may communicate with the UE using the frequency band $402_{f2}$ without activating frequency-switching between the frequency band $402_{f2}$ and the frequency band $402_{f4}$. As the channel quality in the frequency band $402_{f2}$ degrades, the BS may activate the frequency-switching and may communicate with the UE by switching between the frequency band $402_{f2}$ and the frequency band $402_{f4}$. When the channel in the frequency band $402_{f2}$ continues to degrade or fails, the BS may switch to the frequency band $402_{f4}$ for communications with the UE. Subsequently, when the channel quality in the frequency band $402_{f2}$ recovers, the BS may switch back to the frequency band $402_{f2}$ for communications with the UE. Thus, the use of multiple frequency bands 402 can provide frequency diversity and mitigate outages due to hidden-node interference. Mechanisms for scheduling and/or switching between multiple frequency bands 402 for communications are described in greater detail herein.

FIG. 5 illustrates a broadcast system information transmission scheme 500 according to some embodiments of the present disclosure. The scheme 500 may be employed by a BS such as the BSs 105 and 300 and a UE such as the UEs 115 and 200 in a network such as the network 100. The scheme 500 is substantially similar to the scheme 400, and may use the same reference numerals as in FIG. 4 for simplicity sake. However, in the scheme 500, a BS (e.g., BS 105 in FIG. 1) may transmit system information 410 over different frequency bands 402 during non-overlapping time intervals. For example, the BS may transmit the system information $410a$ in the frequency band $402_{f2}$ during a time interval 502 and may transmit the system information $410b$ in the frequency band $402_{f4}$ during a time interval 504 offset from the time interval 502. In the scheme 500, the BS may perform LBTs separately in the frequency bands $402_{f2}$ and $402_{f4}$. Similar to the scheme 400, the BS may repeat the transmissions of the system information $410a$ in frequency band $402_{f2}$ and the system information $410b$ in the frequency band $402_{f4}$, for example, during time intervals 506 and 508, respectively, based on a predetermined periodicity. In addition, the system information $410a$ and/or the system information $410b$ may indicate the link 408 or the association between the frequency band $402_{f2}$ and the frequency band $402_{f4}$.

In some embodiments, a BS (e.g., BS 105 in FIG. 1) may select between the scheme 400 and the scheme 500 based on the RF capability of the BS. For example, a BS capable of transmitting over multiple frequency carriers at the same time may use the schemes 400 and/or 500. Conversely, a BS that does not support simultaneous transmissions over multiple frequency carriers may use the scheme 500.

When a BS (e.g., BS 105 in FIG. 1) uses the scheme 400 or 500 to broadcast system information over multiple frequency carriers, a UE (e.g., UE 115 in FIG. 1) may select one or more of the frequency carriers for an initial network access and/or a network attachment. Subsequently, the BS may communicate with the UE using one or more of the frequency carriers. Mechanisms for performing initial network access procedures, network attachment procedures, idle mode procedures, and data transfer are described in greater detail herein.

Figure 6:
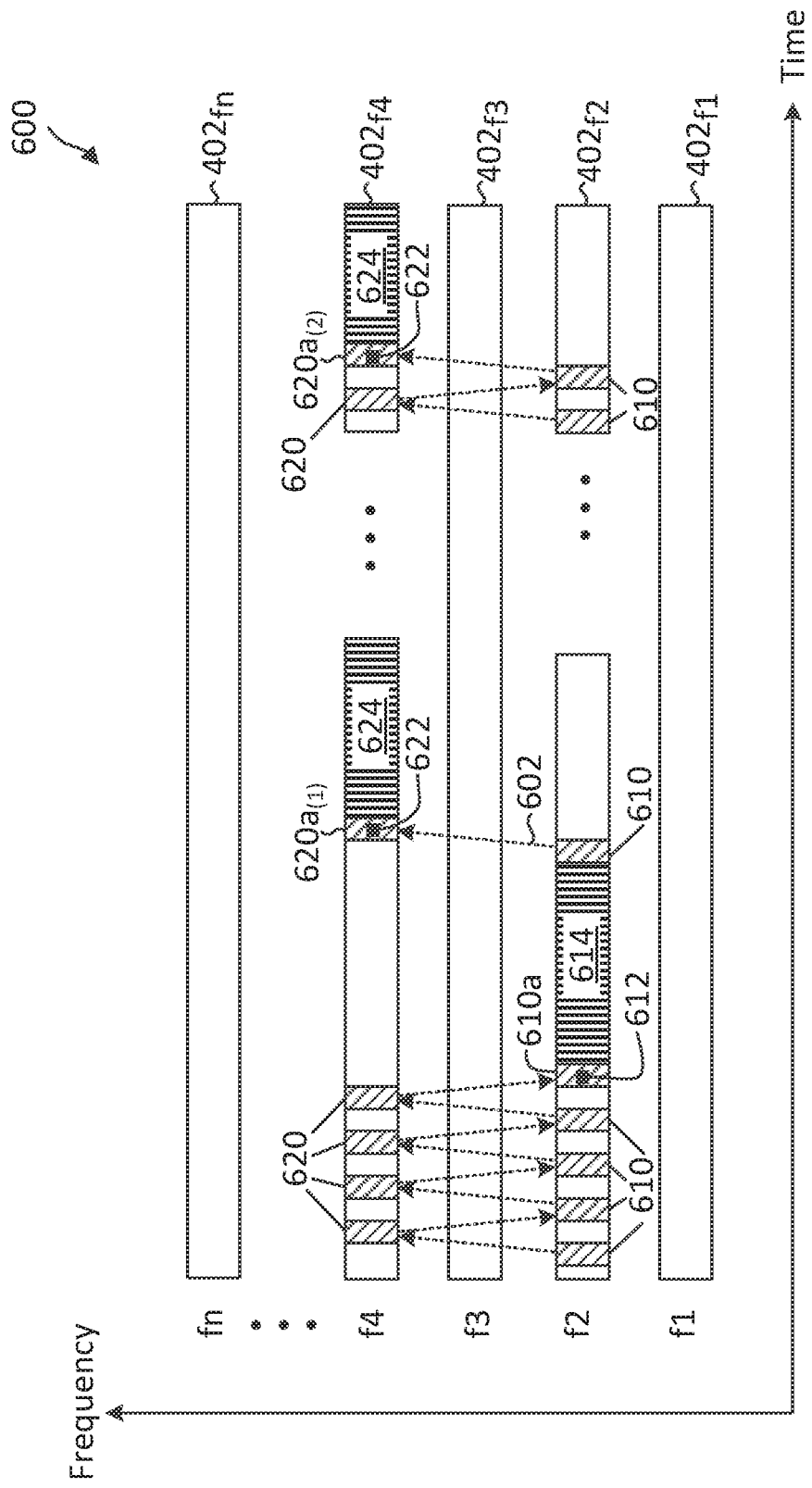
FIG. 6 illustrates a schedule monitoring and data communication scheme with frequency-switching according to some embodiments of the present disclosure.
Figure 7:
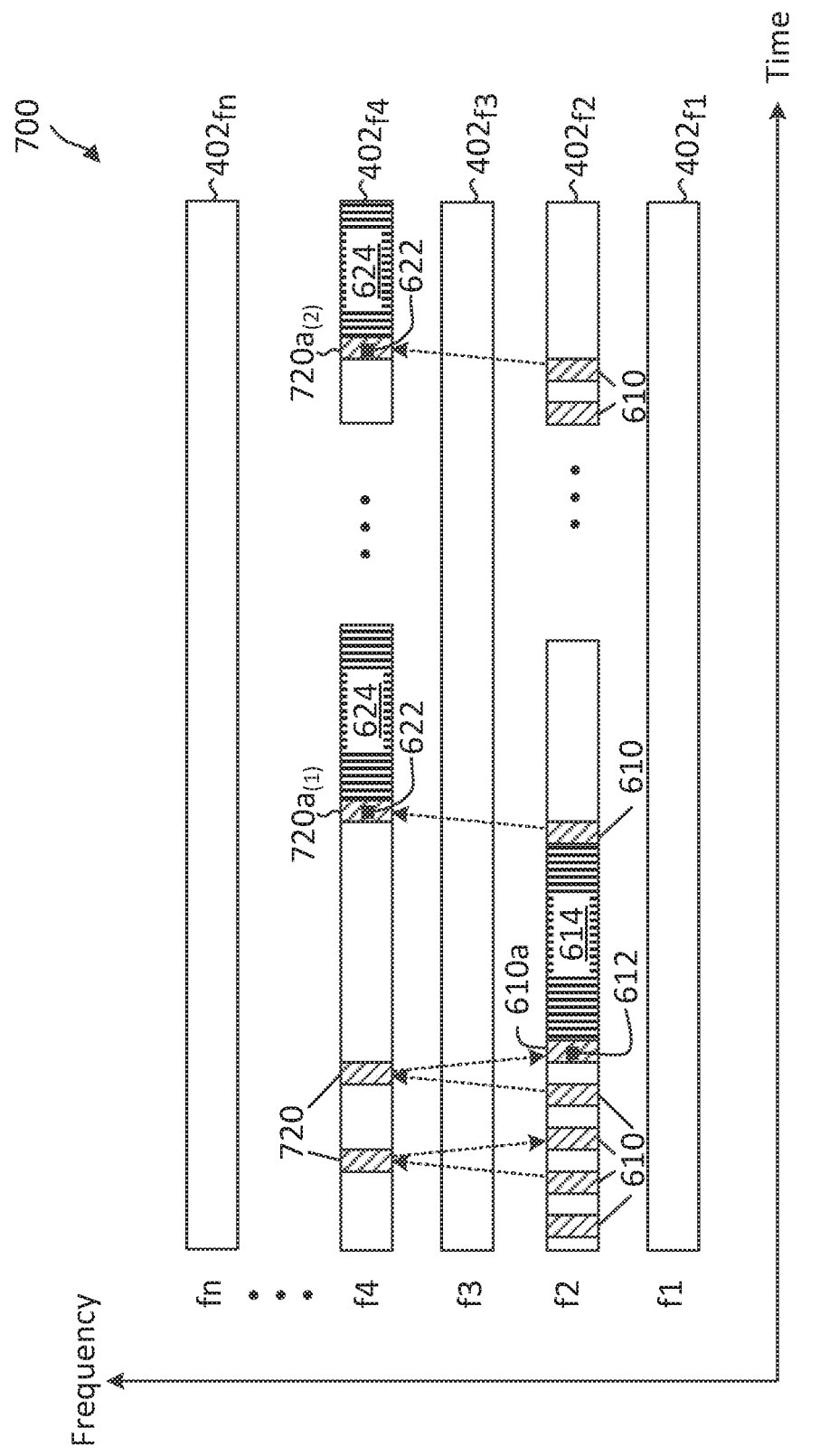
FIG. 7 illustrates a schedule monitoring and data communication scheme with frequency-switching according to some embodiments of the present disclosure.

FIGS. 6-7 illustrate mechanisms for schedule monitoring and data communications over multiple unlicensed and/or shared frequency carriers. In FIGS. 6-7, the x-axes represent time in some constant units, and the y-axes represent frequency in some constant units.

FIG. 6 illustrates a schedule monitoring and data communication scheme 600 with frequency-switching according to some embodiments of the present disclosure. The scheme 600 may be employed by a BS such as the BSs 105 and 300 and a UE such as the UEs 115 and 200 in a network such as the network 100. The scheme 600 can be used in conjunction with the schemes 400 and/or 500. The scheme 600 is illustrated using the same frequency band configuration as in the schemes 400 and 500, where a BS may broadcast system information 410 in the frequency bands $402_{f2}$ and $402_{f4}$, and may use the same reference numerals as in FIGS. 4 and 5 for simplicity sake. As described above, the system information 410 may include a frequency-switching configuration or pattern for channel monitoring. For example, the frequency-switching configuration may indicate a set of channel monitoring periods 610 in the frequency bands $402_{f2}$ and a set of channel monitoring periods 620 in the frequency band $402_{f4}$. The channel monitoring periods 610 may have the same periodicity as the channel monitoring periods 620. The channel monitoring periods 610 may time-interleave with the channel monitoring periods 620 such that channel monitoring periods 610 are non-overlapping with the channel monitoring periods 620.

In the scheme 600, a BS (e.g., BS 105 in FIG. 1) may transmit a scheduling grant in a channel monitoring period 610 to schedule a communication with a UE (e.g., UE 115 in FIG. 1) in the frequency band $402_{f2}$. Alternatively, the BS may transmit a scheduling grant in a channel monitoring period 620 to schedule a communication with the UE in the frequency band $402_{f4}$. The transmission of a scheduling grant may depend on an LBT result in a corresponding frequency band $402_{f2}$ or $402_{f4}$.

For example, the BS may perform an LBT in the frequency band $402_{f2}$ prior to a channel monitoring period $610a$. Upon a successful LBT, the BS may transmit a scheduling grant 612 in the channel monitoring period $610a$ to schedule a communication 614 with the UE in the frequency band $402_{f2}$. The communication 614 can be a UL data communication or a DL data communication. The BS may perform similar LBT operations in the frequency band $402_{f4}$ prior to transmitting scheduling grants 622 in the channel monitoring periods $620a_{(1)}$ and $620a_{(2)}$.

A UE may monitor for a scheduling grant from the BS in the frequency band $402_{f2}$ during the channel monitoring periods 610. The UE may also monitor for a scheduling grant from the BS in the frequency band $402_{f4}$ during the channel monitoring periods 620. For example, the UE may switch or hop between the frequency band $402_{f2}$ and the frequency band $402_{f4}$ during the monitoring when no scheduling grant is received from the BS as shown by the dotted arrows. To facilitate the switching, the UE may be time-synchronized to the BS. In other words, the UE and the BS may use a common timeline for communications. The synchronization can be established during an initial network access procedure and can be tracked, for example, based on reference pilot signals received from the BS.

Upon detecting a scheduling grant 612 in the channel monitoring period 610a, the UE may proceed to communicate with the BS in the frequency band $402_{f2}$ based on the scheduling grant 612 as shown by the communication 614. In some embodiments, when the scheduling grant 612 is for a UL communication, the UE may perform an LBT prior to the communication 614. After completing the communication 614, the UE may continue to monitor for a scheduling grant from the BS and may switch between the frequency band $402_{f2}$ and the frequency band $402_{f4}$ for the monitoring based on the frequency-switching configuration. While the communication 614 is ongoing in the frequency band $402_{f2}$, the UE can skip the monitoring in the frequency band $402_{f4}$. Similarly, upon detecting a scheduling grant 622 in the channel monitoring period $620a_{(1)}$ or $620a_{(2)}$, the UE may proceed to communicate with the BS in the frequency band $402_{f4}$ based on the scheduling grant 622 as shown by the communication 624. While the communication 624 is ongoing in the frequency band $402_{f4}$, the UE can skip the monitoring in the frequency band $402_{f2}$.

In some embodiments, when communications in the frequency band $402_{f2}$ is reliable, the BS may continue to schedule the UE for communications in the frequency band $402_{f2}$ without activating the switching to the other frequency band $402_{f4}$. The switching from the frequency band $402_{2}$ to the frequency band $402_{f4}$ for the scheduling of the communication 624 (shown by the arrow 602) may be based on a threshold comparison. For example, the BS may detect that the channel quality in the frequency band $402_{f2}$ falls below a certain threshold and determine the switch based on the detection. The switching can also be based on some statistical performance measures in the frequency band $402_{f2}$. For example, the performance measures can include bit-error-rate (BER), packet-error-rate (PER), and/or the number of acknowledgements/negative-acknowledgements (ACKs/NAKs) received from the UE or number of ACKs/NAKs transmitted to the UEs.

While the scheme 600 describes the channel monitoring in the channel monitoring periods 610 and 620 as scheduling grant monitoring, the scheme 600 can include reservation preamble signal monitoring in the channel monitoring. For example, a BS may perform an LBT in a channel. When the LBT is successful, the BS may transmit a reservation preamble (e.g., a predetermined sequence) in the channel to indicate that the BS has gained access to the channel Subsequently, the BS may transmit a scheduling grant to provide a UE with scheduling information. Thus, a UE may monitor the frequency bands for a reservation preamble in a channel monitoring period 610 or 620. Upon detecting a reservation preamble in the frequency band $402_{f2}$ or $402_{f4}$ from the BS, the UE may continue to monitor the corresponding frequency band $402_{f2}$ or $402_{f4}$ for a scheduling grant from the BS.

In some embodiments, a BS may associate more than two frequency bands 402 for communications with a UE, where the frequency bands 402 may be associated in a particular order. In such embodiments, each associated frequency band 402 may include a set of channel monitoring periods (e.g., the channel monitoring periods 610 and 620). The UE may hop from one frequency band 402 to a next frequency band 402 for channel monitoring according to the association order.

FIG. 7 illustrates a schedule monitoring and data communication scheme 700 with frequency-switching according to some embodiments of the present disclosure. The scheme 700 may be employed by a BS such as the BSs 105 and 300 and a UE such as the UEs 115 and 200 in a network such as the network 100. The scheme 700 can be used in conjunction with the schemes 400 and/or 500. The scheme 700 is illustrated using the same frequency band configuration as in the schemes 400 and 500, where a BS may broadcast system information 410 in the frequency bands $402_{f2}$ and $402_{f4}$, and may use the same reference numerals as in FIGS. 4 and 5 for simplicity sake. The scheme 700 is substantially similar to the scheme 600, but may include channel monitoring periods of different periodicities in different frequency bands 402. As shown, the frequency band $402_{f4}$ includes a set of channel monitoring periods 720 with a longer periodicity than the set of channel monitoring periods 610 in the frequency band $402_{2}$. Thus, in the scheme 700, a UE may monitor the frequency band $402_{f4}$ less frequently than the frequency band $402_{f2}$.

Figure 8:
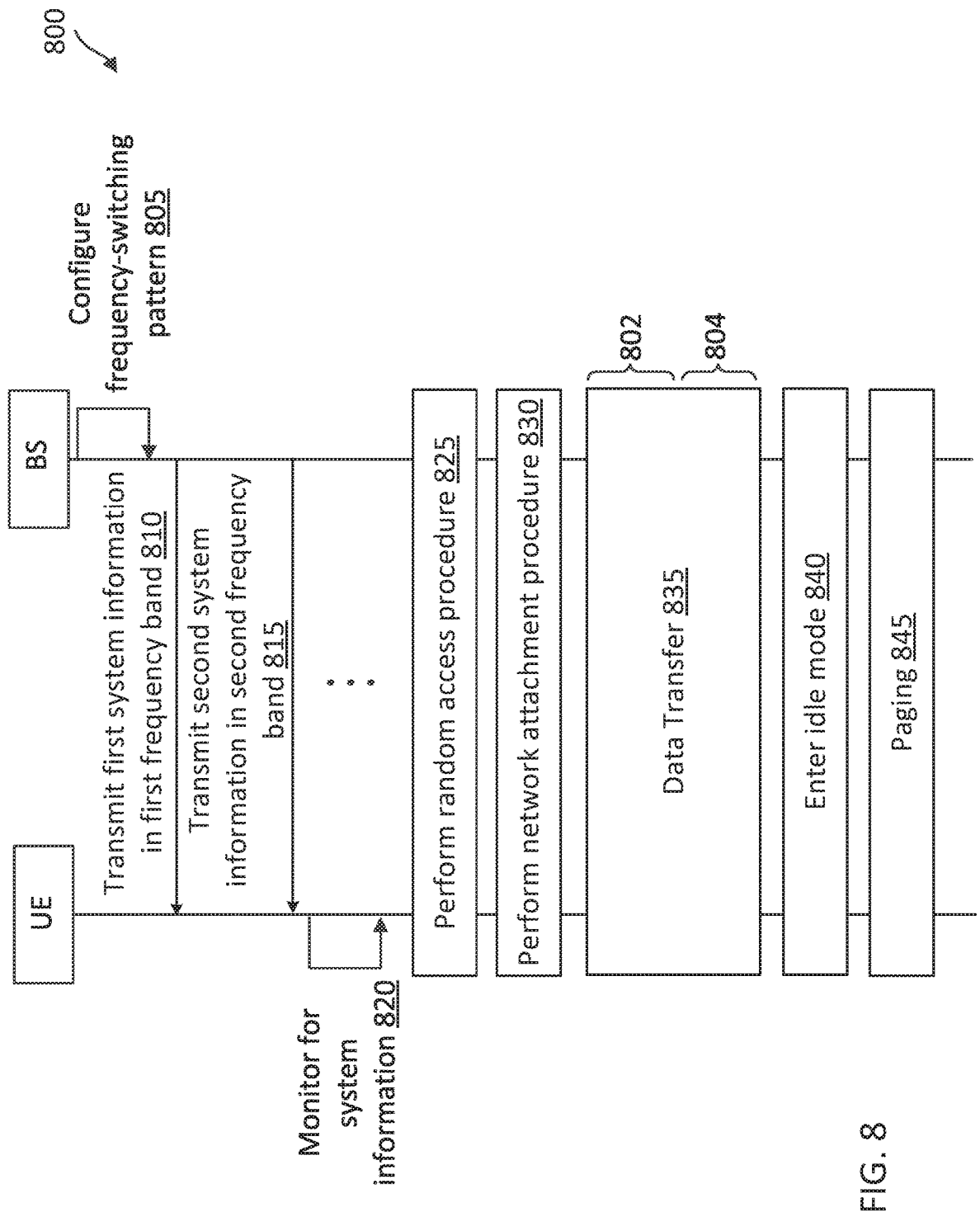
FIG. 8 is a signaling diagram of a communication method that uses multiple frequency carriers to provide frequency diversity according to some embodiments of the present disclosure.

FIG. 8 is a signaling diagram of a communication method 800 that uses multiple frequency carriers to provide frequency diversity according to some embodiments of the present disclosure. The method 800 is implemented by a BS (e.g., the BSs 105 and 300) and a UE (e.g., the UEs 115 and 200) in a network (e.g., the network 100). The method 800 may use similar mechanisms as in the schemes 400, 500, 600, and 700 described above with respect to FIGS. 4, 5, 6, and 7. Steps of the method 800 can be executed by computing devices (e.g., a processor, processing circuit, and/or other suitable component) of the BS and the UE. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 805, the BS configures a frequency-switching pattern for opportunistic switching between a first frequency band and a second frequency band. The first frequency band and the second frequency band may be unlicensed or shared frequency bands. For example, the first frequency band may correspond to the frequency band $402_{f2}$. The second frequency band may correspond to the frequency band $402_{f4}$.

At step 810, the BS transmits first system information (e.g., the system information 410a) in the first frequency band. At step 815, the BS transmits second system information (e.g., the system information 410a) in the second frequency band. The BS may associate the first frequency band with the second frequency band. The BS may generate a soft link (e.g., the links 408) between the first system information and the second system information. For example, the BS may include a pointer in the first system information referencing the second system information in the second frequency band. The pointer functions as an indication of the association between the first frequency and the second frequency band. The first system information may include a random access configuration and/or a paging configuration for performing random access and/or paging, respectively, in the first frequency band. The second system information may include a random access configuration and/or a paging configuration for performing random access and/or paging, respectively, in the second frequency band. The first system information and/or the second system information may include a frequency-switching configuration for switching between the first frequency band and the second frequency band. For example, the frequency-switching configuration may include a similar schedule monitoring pattern as in the schemes 600 and 700.

At step 820, the UE monitors for system information from the BS. Upon detecting the first system information and/or the second system information, the UE may synchronize to the BS (e.g., based on synchronization signals in the system information). The UE may perform cell selection based on the reception qualities of the first system information and/or the second system information. For example, the UE may determine to proceed with an initial network access procedure with the BS.

At step 825, the UE performs a network random access procedure with the BS. The UE may initiate the random access procedure by transmitting a random access preamble to the BS. In some embodiments, the UE may select the frequency band with the higher signal quality based on the receptions of the first system information and the second system information for the random access procedure. In some other embodiments, the UE may perform the random access procedure over both the first and second frequency bands, for example, switching between the first and second frequency bands using the schemes 600 and/or 700.

To transmit a random access preamble in the first frequency band, the UE may generate a random access preamble based on a random access preamble format in the first system information and transmit the random access preamble using a random access resource indicated in the first system information. Similarly, to transmit a random access preamble in the second frequency band, the UE may generate a random access preamble based on a random access preamble format in the second system information and transmit the random access preamble using a random access resource indicated in the second system information.

The BS may respond to a random access preamble by transmitting a random access response to the UE. The BS may transmit a random access response in the same frequency band where the BS received the random access preamble. For example, the BS may transmit a random access response in the first frequency band when the random access preamble is received from the first frequency band. Alternatively, the BS may transmit the random access response by switching to the second frequency band, for example, depending on the channel quality of the first frequency band. After receiving the random access response, the UE may transmit an RRC connection request to the BS. The BS may respond to the connection request by transmitting a contention resolution and an RRC connection setup response to the UE.

During the random access procedure, the BS and the UE may establish a common timeline for communications. The BS and the UE may exchange the random access response, the RRC connection request, and/or the contention resolution and RRC connection setup response in the first frequency band and/or the second frequency band using the schemes 600 and/or 700.

At step 830, after completing the random access procedure, the UE may perform a network attachment procedure with the BS to register with the network. The UE may initiate the registration by transmitting an attachment request to the BS. The BS may coordinate with various network entities or next generation core (NGC) entities, such as access and mobility management function (AMF), a session management function (SMF), and/or user plane function (UPF), to complete the network attachment procedure. For example, the BS may coordinate with the network entities in the NGC to identify the UE, authenticate the UE, and/or authorize the UE for sending and/or receiving data in the network. The network attachment procedure may be performed over the first frequency band, the second frequency band, or switching between the first and second frequency bands. At the end of the attachment procedure, the UE is known to the network and an association between the UE, the first frequency band, and the second frequency band may be established.

At step 835, after completing the network attachment procedure, the UE may enter an active mode and exchange data with the BS, for example, using the schemes 600 and/or 700. In some embodiments, the BS may schedule the UE using one of the first and second frequency bands. For example, the BS may configure the first frequency band as a primary band and may configure the second frequency band as a secondary or backup band. For example, the BS may communicate with the UE over the first frequency band in a time period 802 and may switch to communicate with the UE in the second frequency band in a time period 804. The switching can be based on a channel quality of the first frequency band falling below a certain threshold and/or an increase in packet error rates (PERs). In some embodiments, the BS may switch back to first frequency band for communications with the UE when the channel quality of the first frequency band recovers (e.g., meeting a certain threshold).

At step 840, after completing the data transfer, the UE may enter an idle mode. The UE may sleep based on a discontinuous reception (DRX) cycle, for example, configured in the first system information and/or the second system information. The UE may periodically wake up to monitor for scheduling grants related to paging messages.

At step 845, while the UE is in an idle mode, the BS may page the UE, for example, triggered by an arrival of network data for the UE. The BS may transmit a paging message to the UE over the first frequency band and/or the second frequency band, for example, based on paging occasions and/or resources configured in the first system information and/or the second system information.

Figure 9:
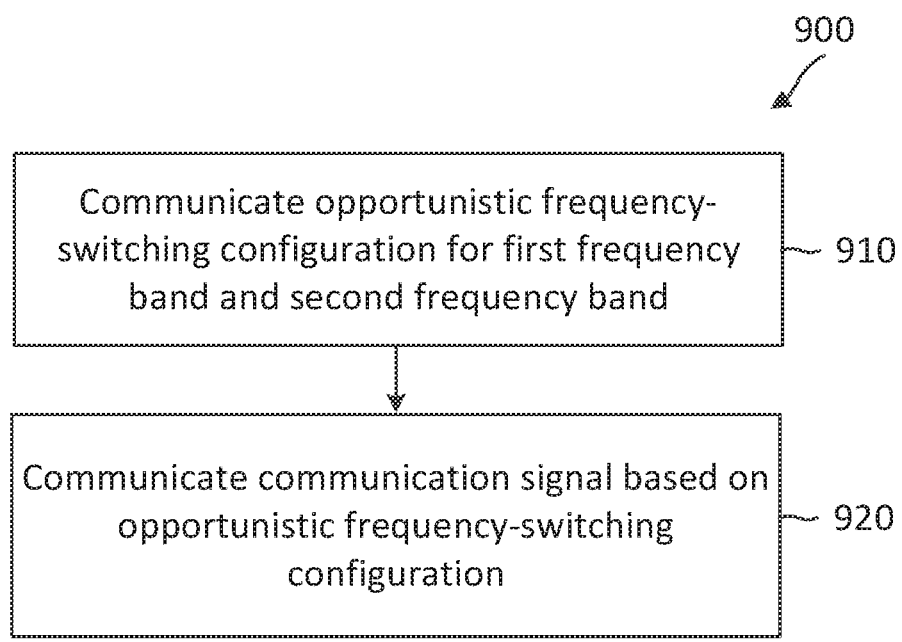
FIG. 9 is a flow diagram of a communication method according to embodiments of the present disclosure.

FIG. 9 is a flow diagram of a communication method 900 according to embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or UE 200, may utilize one or more components, such as the processor 202, the memory 204, the frequency-switching-based communication module 208, the transceiver 210, the modem 212, and the one or more antennas 216, to execute the steps of method 900. In another example, a wireless communication device, such as the BS 105 or BS 300, may utilize one or more components, such as the processor 302, the memory 304, the frequency-switching-based communication module 308, the transceiver 310, the modem 312, and the one or more antennas 316, to execute the steps of method 900. The method 900 may employ similar mechanisms as in the schemes 400, 500, 600, and 700 and the method 800 described above with respect to FIGS. 4, 5, 6, 7, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device, an opportunistic frequency-switching configuration for a first frequency band (e.g., the first frequency band 402$_{f2}$) and a second frequency band (e.g., the second frequency band 402$_{f4}$). The first frequency band and the second frequency band are shared by a first network operating entity and a second network operating entity.

At step 920, the method 900 includes communicating, by the first wireless communication device with the second wireless communication device, a communication signal based on the opportunistic frequency-switching configuration.

In some embodiments, the first wireless communication device may correspond to a BS and the second wireless communication device may correspond to a UE. In such embodiments, the first wireless communication device may transmit the opportunistic frequency-switching configuration to the second wireless communication device. In some other embodiments, the first wireless communication device may correspond to a UE and the second wireless communication device may correspond to a BS. In such embodiments, the first wireless communication device may receive the opportunistic frequency-switching configuration from the second wireless communication device.

In some embodiments, the first wireless communication device may communicate first system information (e.g., system information 410*a*) including the opportunistic frequency-switching configuration with the second wireless communication device in the first frequency band. The first wireless communication may communicate second system information (e.g., system information 410*b*) including the opportunistic frequency-switching configuration with the second wireless communication device in the second frequency band.

In some embodiments, the first system information may be communicated in the first frequency band concurrent with the second system information in the second frequency band, for example, as shown in the scheme 400.

In some embodiments, the first system information may be communicated in the first frequency band during a first time period (e.g., the period 502) and the second system information may be communicated in the second frequency band during a second time period (e.g., the period 504) different from the first time period, for example, as shown in the scheme 500.

In some embodiments, the opportunistic frequency-switching configuration may indicate a first set of schedule monitoring periods (e.g., the channel monitoring periods 610) in the first frequency band and a second set of schedule monitoring periods (e.g., the channel monitoring periods 620 and 720) in the second frequency band.

In some embodiments, the first wireless communication device may communicate the communication signal with the second wireless communication device by communicating, with the second wireless communication device, a first scheduling grant (e.g., the scheduling grant 612) in a schedule monitoring period (e.g., the channel monitoring periods 610*a*) of the first set and a second scheduling grant (e.g., the scheduling grant 622) in a schedule monitoring period (e.g., the channel monitoring periods 620*a* and 720*a*) of the second set based on the opportunistic frequency-switching configuration.

In some embodiments, the first wireless communication device may communicate the opportunistic frequency-switching configuration with the second wireless communication via an RRC message, a MAC CE, or DCI. In some embodiments, the RRC message, the DCI, or the MAC CE can be a UE-specific message destined to the second wireless communication.

Figure 10:
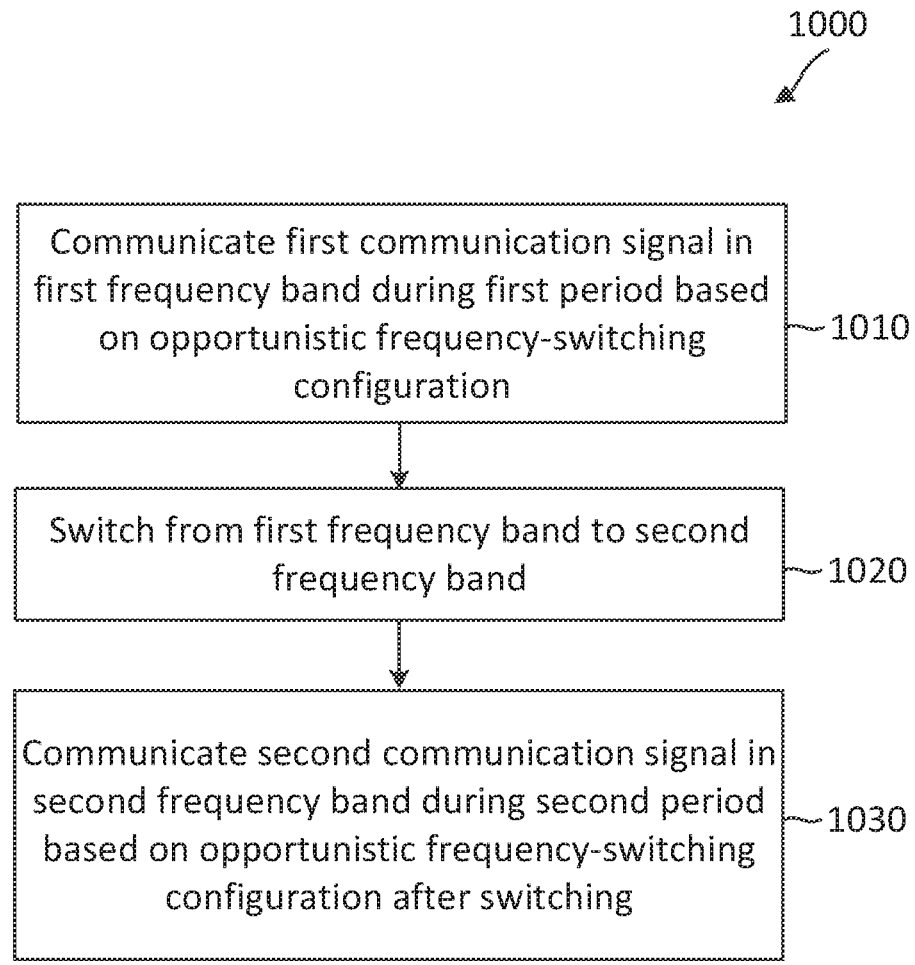
FIG. 10 is a flow diagram of a communication method according to embodiments of the present disclosure.

FIG. 10 is a flow diagram of a communication method 1000 according to embodiments of the present disclosure. Steps of the method 1000 can be executed by a computing device (e.g., a processor, processing circuit, and/or other suitable component) of a wireless communication device or other suitable means for performing the steps. For example, a wireless communication device, such as the UE 115 or UE 200, may utilize one or more components, such as the processor 202, the memory 204, the frequency-switching-based communication module 208, the transceiver 210, the modem 212, and the one or more antennas 216, to execute the steps of method 1000. In another example, a wireless communication device, such as the BS 105 or BS 300, may utilize one or more components, such as the processor 302, the memory 304, the frequency-switching-based communication module 308, the transceiver 310, the modem 312, and the one or more antennas 316, to execute the steps of method 1000. The method 1000 may employ similar mechanisms as in the schemes 400, 500, 600, and 700 and the method 800 described above with respect to FIGS. 4, 5, 6, 7, and 8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes communicating, by a first wireless communication device with a second wireless communication device, a first communication signal in a first frequency band (e.g., the first frequency band 402$_{f2}$) during a first period based on an opportunistic frequency-switching configuration.

At step 1020, the method 1000 includes switching, by the first wireless communication device, from the first frequency band to a second frequency band (e.g., the first frequency band 402$_{f4}$) based on the opportunistic frequency-switching configuration. The first frequency band and the second frequency band are shared by a first network operating entity and a second network operating entity.

At step 1030, the method 1000 includes communicating, by the first wireless communication device with the second wireless communication device after the switching, a second communication signal in the second frequency band during a second period based on the opportunistic frequency-switching configuration.

In some embodiments, the opportunistic frequency-switching configuration may indicate a first set of schedule monitoring periods (e.g., the channel monitoring periods 610) in the first frequency band and a second set of schedule monitoring periods (e.g., the channel monitoring periods 620 and 720) in the second frequency band. The first period (e.g., the channel monitoring period 610*a*) may be a schedule monitoring period of the first set. The second period (e.g., the channel monitoring period 620*a* or 720*a*) may be a schedule monitoring period of the second set. In some embodiments, the first set of schedule monitoring periods may interleave with the second set of schedule monitoring periods in time.

In some embodiments, the first wireless communication device may correspond to a UE. IN such embodiments, the first wireless communication device may monitor for a first scheduling grant (e.g., the scheduling grant 612) from the second wireless communication device in the first frequency band during the first period, where the first communication signal may be communicated based on the first scheduling grant. After the switching, the first wireless communication device may monitor for a second scheduling grant (e.g., the scheduling grant 622) from the second wireless communication device in the second frequency band during the second period, where the second communication signal may be communicated based on the second scheduling grant. In some embodiments, the monitoring for the first scheduling grant may be performed in response to determining that there is no scheduling grant detected in the second frequency band during a preceding schedule monitoring period of the second set.

In some embodiments, the first wireless communication device may correspond to a BS and the second wireless communication may correspond to a UE. In such embodiments, the first wireless communication device may communicate the first communication signal by transmitting a first scheduling grant to the second wireless communication device in the first frequency band during the first period. The first wireless communication device may communicate the second communication signal by transmitting a second scheduling grant to the second wireless communication device in the second frequency band during the second period. In some embodiments, the first wireless communication device may transmit the second scheduling grant when determining that the communicating the first communication signal is unsuccessful. In some embodiments, the first wireless communication device may perform a first LBT in the first frequency band, where the first scheduling grant may be transmitted based on the first LBT. Similarly, the first wireless communication device may perform a second LBT in the second frequency band, where the second scheduling grant may be transmitted based on the second LBT.

In some embodiments, the first communication signal and the second communication signal may be associated with at least one of a network system information broadcast, a random access procedure, a network attachment procedure, or a paging procedure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, an opportunistic frequency-switching configuration for a first frequency band and a second frequency band, the first frequency band and the second frequency band shared by a first network operating entity and a second network operating entity; and communicating, by the first wireless communication device with the second wireless communication device, a communication signal based on the opportunistic frequency-switching configuration.

In some embodiments, wherein the communicating the opportunistic frequency-switching configuration includes communicating, by the first wireless communication device with the second wireless communication device in the first frequency band, first system information including the opportunistic frequency-switching configuration; and communicating, by the first wireless communication device with the second wireless communication device in the second frequency band, second system information including the opportunistic frequency-switching configuration. In some embodiments, wherein the first system information is communicated in the first frequency band concurrent with the second system information in the second frequency band. In some embodiments, wherein the first system information is communicated in the first frequency band during a first time period, and wherein the second system information is communicated in the second frequency band during a second time period different from the first time period. In some embodiments, wherein the opportunistic frequency-switching configuration indicates a first set of schedule monitoring periods in the first frequency band and a second set of schedule monitoring periods in the second frequency band. In some embodiments, wherein the communicating the communication signal includes communicating, by the first wireless communication device with the second wireless communication device, a first scheduling grant in a schedule monitoring period of the first set based on the opportunistic frequency-switching configuration; and communicating, by the first wireless communication device with the second wireless communication device, a second scheduling grant in a schedule monitoring period of the second set based on the opportunistic frequency-switching configuration. In some embodiments, wherein the communicating the opportunistic frequency-switching configuration includes communicating, by the first wireless communication device with the second wireless communication device, at least one of a radio resource control (RRC) message including the opportunistic frequency-switching configuration, a downlink control information (DCI) message including the opportunistic frequency-switching configuration, or a media access control (MAC) control element (CE) message including the opportunistic frequency-switching configuration. In some embodiments, wherein at least one of the RRC message, the DCI message, or the MAC CE message is destined to the second wireless communication device.

Further embodiments of the present disclosure include a method of wireless communication, comprising communicating, by a first wireless communication device with a second wireless communication device, a first communication signal in a first frequency band during a first period based on an opportunistic frequency-switching configuration; switching, by the first wireless communication device, from the first frequency band to a second frequency band based on the opportunistic frequency-switching configuration, wherein the first frequency band and the second frequency band are shared by a first network operating entity and a second network operating entity; and communicating, by the first wireless communication device with the second wireless communication device after the switching, a second communication signal in the second frequency band during a second period based on the opportunistic frequency-switching configuration.

In some embodiments, wherein the opportunistic frequency-switching configuration indicates a first set of schedule monitoring periods in the first frequency band and a second set of schedule monitoring periods in the second frequency band, wherein the first period is a schedule monitoring period of the first set, and wherein the second period is a schedule monitoring period of the second set. In some embodiments, wherein the first set of schedule monitoring periods interleaves with the second set of schedule monitoring periods in time. In some embodiments, the method further comprises monitoring, by the first wireless communication device, for a first scheduling grant from the second wireless communication device in the first frequency band during the first period, wherein the first communication signal is communicated based on the first scheduling grant; and monitoring, by the first wireless communication device after the switching, for a second scheduling grant from the second wireless communication device in the second frequency band during the second period, wherein the second communication signal is communicated based on the second scheduling grant. In some embodiments, wherein the monitoring for the first scheduling grant is performed in response to determining that there is no scheduling grant detected in the second frequency band during a preceding schedule monitoring period of the second set. In some embodiments, wherein the communicating the first communication signal includes transmitting, by the first wireless communication device to the second wireless communication device, a first scheduling grant in the first frequency band during the first period, and wherein the communicating the second communication signal includes transmitting, by the first wireless communication device to the second wireless communication device, a second scheduling grant in the second frequency band during the second period. In some embodiments, the method further comprises determining, by the first wireless communication device, that the communicating the first communication signal is unsuccessful, wherein the transmitting the second scheduling grant is based on the determining. In some embodiments, the method further comprises performing, by the first wireless communication device, a first listen-before-talk (LBT) in the first frequency band, wherein the first scheduling grant is transmitted based on first LBT; and performing, by the first wireless communication device, a second LBT in the second frequency band, wherein the second scheduling grant is transmitted based on second LBT. In some embodiments, wherein the first communication signal and the second communication signal are associated with at least one of a network system information broadcast, a random access procedure, a network attachment procedure, or a paging procedure.

Further embodiments of the present disclosure include an apparatus comprising a transceiver configured to communicate, with a wireless communication device, an opportunistic frequency-switching configuration for a first frequency band and a second frequency band, the first frequency band and the second frequency band shared by a first network operating entity and a second network operating entity; and communicate, with the wireless communication device, a communication signal based on the opportunistic frequency-switching configuration.

In some embodiments, wherein the transceiver is further configured to communicate the opportunistic frequency-switching configuration by communicating, with the wireless communication device in the first frequency band, first system information including the opportunistic frequency-switching configuration; and communicating, with the wireless communication device in the second frequency band, second system information including the opportunistic frequency-switching configuration. In some embodiments, wherein the first system information is communicated in the first frequency band concurrent with the second system information in the second frequency band. In some embodiments, wherein the first system information is communicated in the first frequency band during a first time period, and wherein the second system information is communicated in the second frequency band during a second time period different from the first time period. In some embodiments, wherein the opportunistic frequency-switching configuration indicates a first set of schedule monitoring periods in the first frequency band and a second set of schedule monitoring periods in the second frequency band. In some embodiments, wherein the transceiver is further configured to communicate the communication signal by communicating, with the wireless communication device, a first scheduling grant in a schedule monitoring period of the first set based on the opportunistic frequency-switching configuration; and communicating, with the wireless communication device, a second scheduling grant in a schedule monitoring period of the second set based on the opportunistic frequency-switching configuration. In some embodiments, wherein the transceiver is further configured to communicate the opportunistic frequency-switching configuration by communicating, with the wireless communication device, at least one of a radio resource control (RRC) message including the opportunistic frequency-switching configuration, a downlink control information (DCI) message including the opportunistic frequency-switching configuration, or a media access control (MAC) control element (CE) message including the opportunistic frequency-switching configuration. In some embodiments, wherein at least one of the RRC message, the DCI message, or the MAC CE message is destined to the wireless communication device.

Further embodiments of the present disclosure include an apparatus comprising a transceiver configured to communicate, with a wireless communication device, a first communication signal in a first frequency band during a first period based on an opportunistic frequency-switching configuration; switch from the first frequency band to a second frequency band based on the opportunistic frequency-switching configuration, wherein the first frequency band and the second frequency band are shared by a first network operating entity and a second network operating entity; and communicate, with the wireless communication device after the switching, a second communication signal in the second frequency band during a second period based on the opportunistic frequency-switching configuration.

In some embodiments, wherein the opportunistic frequency-switching configuration indicates a first set of schedule monitoring periods in the first frequency band and a second set of schedule monitoring periods in the second frequency band, wherein the first period is a schedule monitoring period of the first set, and wherein the second period is a schedule monitoring period of the second set. In some embodiments, wherein the first set of schedule monitoring periods interleaves with the second set of schedule monitoring periods in time. In some embodiments, the apparatus further comprises a processor configured to monitor for a first scheduling grant from the wireless communication device in the first frequency band during the first period, wherein the first communication signal is communicated based on the first scheduling grant; and monitor, after the switching, for a second scheduling grant from the wireless communication device in the second frequency band during the second period, wherein the second communication signal is communicated based on the second scheduling grant. In some embodiments, wherein the first scheduling grant is monitored in response to a determination that there is no scheduling grant detected in the second frequency band during a preceding schedule monitoring period of the second set. In some embodiments, wherein the transceiver is further configured to communicate the first communication signal by transmitting, to the wireless communication device, a first scheduling grant in the first frequency band during the first period; and communicate the second communication signal by transmitting, to the wireless communication device, a second scheduling grant in the second frequency band during the second period. In some embodiments, the apparatus further comprising a processor configured to determine whether the communicating the first communication signal is successful, wherein the second scheduling grant is transmitted when the communicating the first communication signal is determined to be unsuccessful. In some embodiments, the apparatus further comprises a processor configured to perform a first listen-before-talk (LBT) in the first frequency band, wherein the first scheduling grant is transmitted based on first LBT; and perform a second LBT in the second frequency band, wherein the second scheduling grant is transmitted based on second LBT. In some embodiments, wherein the first communication signal and the second communication signal are associated with at least one of a network system information broadcast, a random access procedure, a network attachment procedure, or a paging procedure.

Further embodiments of the present disclosure include a non-transitory computer-readable medium having program code recorded thereon, the program code comprising code for causing a first wireless communication device to communicate, with a second wireless communication device, an opportunistic frequency-switching configuration for a first frequency band and a second frequency band, the first frequency band and the second frequency band shared by a first network operating entity and a second network operating entity; and code for causing the first wireless communication device to communicate, with the second wireless communication device, a communication signal based on the opportunistic frequency-switching configuration.

In some embodiments, wherein the code for causing the first wireless communication device to communicate the opportunistic frequency-switching configuration is further configured to communicate, with the second communication device in the first frequency band, first system information including the opportunistic frequency-switching configuration; and communicate, with the second wireless communication device in the second frequency band, second system information including the opportunistic frequency-switching configuration. In some embodiments, wherein the first system information is communicated in the first frequency band concurrent with the second system information in the second frequency band. In some embodiments, wherein the first system information is communicated in the first frequency band during a first time period, and wherein the second system information is communicated in the second frequency band during a second time period different from the first time period. In some embodiments, wherein the opportunistic frequency-switching configuration indicates a first set of schedule monitoring periods in the first frequency band and a second set of schedule monitoring periods in the second frequency band. In some embodiments, wherein the code for causing the first wireless communication device to communicate the communication signal is further configured to communicate, with the second wireless communication device, a first scheduling grant in a schedule monitoring period of the first set based on the opportunistic frequency-switching configuration; and communicate, with the second wireless communication device, a second scheduling grant in a schedule monitoring period of the second set based on the opportunistic frequency-switching configuration. In some embodiments, wherein the code for causing the first wireless communication device to communicate the opportunistic frequency-switching configuration is further configured to communicate, with the second wireless communication device, at least one of a radio resource control (RRC) message including the opportunistic frequency-switching configuration, a downlink control information (DCI) message including the opportunistic frequency-switching configuration, or a media access control (MAC) control element (CE) message including the opportunistic frequency-switching configuration. In some embodiments, wherein at least one of the RRC message, the DCI message, or the MAC CE message is destined to the second wireless communication device.

Further embodiments of the present disclosure include a non-transitory computer-readable medium having program code recorded thereon, the program code comprising code for causing a first wireless communication device to communicate, with a second wireless communication device, a first communication signal in a first frequency band during a first period based on an opportunistic frequency-switching configuration; code for causing the first wireless communication device to switch from the first frequency band to a second frequency band based on the opportunistic frequency-switching configuration, wherein the first frequency band and the second frequency band are shared by a first network operating entity and a second network operating entity; and code for causing the first wireless communication device to communicate, with the second wireless communication device after the switching, a second communication signal in the second frequency band during a second period based on the opportunistic frequency-switching configuration.

In some embodiments, wherein the opportunistic frequency-switching configuration indicates a first set of schedule monitoring periods in the first frequency band and a second set of schedule monitoring periods in the second frequency band, wherein the first period is a schedule monitoring period of the first set, and wherein the second period is a schedule monitoring period of the second set. In some embodiments, wherein the first set of schedule monitoring periods interleaves with the second set of schedule monitoring periods in time. In some embodiments, the non-transitory computer-readable medium further comprises code for causing the first wireless communication device to monitor for a first scheduling grant from the second wireless communication device in the first frequency band during the first period, wherein the first communication signal is communicated based on the first scheduling grant; and code for causing the first wireless communication device to monitor, after the switching, for a second scheduling grant from the second wireless communication device in the second frequency band during the second period, wherein the second communication signal is communicated based on the second scheduling grant. In some embodiments, wherein the first scheduling grant is monitored in response to a determination that there is no scheduling grant detected in the second frequency band during a preceding schedule monitoring period of the second set. In some embodiments, wherein the code for causing the first wireless communication device to communicate the first communication signal is further configured to transmit, to the second wireless communication device, a first scheduling grant in the first frequency band during the first period, and wherein the code for causing the first wireless communication device to communicate the second communication signal is further configured to transmit, to the second wireless communication device, a second scheduling grant in the second frequency band during the second period. In some embodiments, the non-transitory computer-readable medium further comprises code for causing the first wireless communication device to determine whether the communicating the first communication signal is successful, wherein the second scheduling grant is transmitted when the communicating the first communication signal is determined to be unsuccessful. In some embodiments, the non-transitory computer-readable medium further comprises code for causing the first wireless communication device to perform a first listen-before-talk (LBT) in the first frequency band, wherein the first scheduling grant is transmitted based on first LBT; and code for causing the first wireless communication device to perform a second LBT in the second frequency band, wherein the second scheduling grant is transmitted based on second LBT. In some embodiments, wherein the first communication signal and the second communication signal are associated with at least one of a network system information broadcast, a random access procedure, a network attachment procedure, or a paging procedure.

Further embodiments of the present disclosure include an apparatus comprising means for communicating, with a wireless communication device, an opportunistic frequency-switching configuration for a first frequency band and a second frequency band, the first frequency band and the second frequency band shared by a first network operating entity and a second network operating entity; and means for communicating, with the wireless communication device, a communication signal based on the opportunistic frequency-switching configuration.

In some embodiments, wherein the means for communicating the opportunistic frequency-switching configuration is further configured to communicate, with the wireless communication device in the first frequency band, first system information including the opportunistic frequency-switching configuration; and communicate, with the wireless communication device in the second frequency band, second system information including the opportunistic frequency-switching configuration. In some embodiments, wherein the first system information is communicated in the first frequency band concurrent with the second system information in the second frequency band. In some embodiments, wherein the first system information is communicated in the first frequency band during a first time period, and wherein the second system information is communicated in the second frequency band during a second time period different from the first time period. In some embodiments, wherein the opportunistic frequency-switching configuration indicates a first set of schedule monitoring periods in the first frequency band and a second set of schedule monitoring periods in the second frequency band. In some embodiments, wherein the means for communicating the communication signal is further configured to communicate, with the wireless communication device, a first scheduling grant in a schedule monitoring period of the first set based on the opportunistic frequency-switching configuration; and communicate, with the wireless communication device, a second scheduling grant in a schedule monitoring period of the second set based on the opportunistic frequency-switching configuration. In some embodiments, wherein the means for communicating the opportunistic frequency-switching configuration is further configured to communicate, with the wireless communication device, at least one of a radio resource control (RRC) message including the opportunistic frequency-switching configuration, a downlink control information (DCI) message including the opportunistic frequency-switching configuration, or a media access control (MAC) control element (CE) message including the opportunistic frequency-switching configuration. In some embodiments, wherein at least one of the RRC message, the DCI message, or the MAC CE message is destined to the wireless communication device.

Further embodiments of the present disclosure include an apparatus comprising means for communicating, with a wireless communication device, a first communication signal in a first frequency band during a first period based on an opportunistic frequency-switching configuration; means for switching from the first frequency band to a second frequency band based on the opportunistic frequency-switching configuration, wherein the first frequency band and the second frequency band are shared by a first network operating entity and a second network operating entity; and means for communicating, with the wireless communication device after the switching, a second communication signal in the second frequency band during a second period based on the opportunistic frequency-switching configuration.

In some embodiments, wherein the opportunistic frequency-switching configuration indicates a first set of schedule monitoring periods in the first frequency band and a second set of schedule monitoring periods in the second frequency band, wherein the first period is a schedule monitoring period of the first set, and wherein the second period is a schedule monitoring period of the second set. In some embodiments, wherein the first set of schedule monitoring periods interleaves with the second set of schedule monitoring periods in time. In some embodiments, the apparatus further comprises means for monitoring for a first scheduling grant from the wireless communication device in the first frequency band during the first period, wherein the first communication signal is communicated based on the first scheduling grant; and means for monitoring, after the switching, for a second scheduling grant from the wireless communication device in the second frequency band during the second period, wherein the second communication signal is communicated based on the second scheduling grant. In some embodiments, wherein the first scheduling grant is monitored in response to a determination that there is no scheduling grant detected in the second frequency band during a preceding schedule monitoring period of the second set. In some embodiments, wherein the means for communicating the first communication signal is further configured to transmit, to the wireless communication device, a first scheduling grant in the first frequency band during the first period, and wherein the means for communicating the second communication signal is further configured to transmit, to the wireless communication device, a second scheduling grant in the second frequency band during the second period. In some embodiments, the apparatus further comprises means for determining whether the communicating the first communication signal is successful, wherein the second scheduling grant transmitted when the communicating the first communication signal is determined to be unsuccessful. In some embodiments, the apparatus further comprises means for performing a first listen-before-talk (LBT) in the first frequency band, wherein the first scheduling grant is transmitted based on first LBT; and means for performing a second LBT in the second frequency band, wherein the second scheduling grant is transmitted based on second LBT. In some embodiments, wherein the first communication signal and the second communication signal are associated with at least one of a network system information broadcast, a random access procedure, a network attachment procedure, or a paging procedure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device, an opportunistic frequency-switching configuration for switching between a first frequency band and a second frequency band shared by a first network operating entity and a second network operating entity, the opportunistic frequency-switching configuration indicating a first set of schedule monitoring periods in the first frequency band non-overlapping in time with a second set of schedule monitoring periods in the second frequency band;
   communicating, by the first wireless communication device with the second wireless communication device, a first communication signal in the first frequency band during a first schedule monitoring period of the first set;
   refraining, by the first wireless communication device, from switching to the second frequency band for a second schedule monitoring period of the second set according to the opportunistic frequency-switching configuration in response to successfully communicating the first communication signal in the first frequency band;
   switching, by the first wireless communication device, from the first frequency band to the second frequency band for a third schedule monitoring period of the second set based on a failure to communicate with the second wireless communication device in the first frequency band during a fourth schedule monitoring period of the first set; and
   communicating, by the first wireless communication device with the second wireless communication device after the switching, a second communication signal in the second frequency band during the third schedule monitoring period of the second set.

2. The method of claim 1, wherein the first set of schedule monitoring periods interleaves with the second set of schedule monitoring periods in time.

3. The method of claim 1, further comprising:
   monitoring, by the first wireless communication device, for a first scheduling grant from the second wireless communication device in the first frequency band during the first schedule monitoring period, wherein the first communication signal includes the first scheduling grant; and
   monitoring, by the first wireless communication device after the switching, for a second scheduling grant from the second wireless communication device in the second frequency band during the third schedule monitoring period, wherein the second communication signal includes the second scheduling grant.

4. The method of claim 3, wherein the monitoring for the second scheduling grant is performed in response to determining that there is no scheduling grant detected in the first frequency band during the fourth schedule monitoring period of the first set.

5. The method of claim 1, wherein the communicating the first communication signal includes transmitting, by the first wireless communication device to the second wireless communication device, a first scheduling grant in the first frequency band during the first schedule monitoring period, and wherein the communicating the second communication signal includes transmitting, by the first wireless communication device to the second wireless communication device, a second scheduling grant in the second frequency band during the third schedule monitoring period.

6. The method of claim 5, further comprising:
   determining, by the first wireless communication device, that the communicating the first communication signal is unsuccessful,
   wherein the transmitting the second scheduling grant is based on the determining.

7. The method of claim 5, further comprising:
   performing, by the first wireless communication device, a first listen-before-talk (LBT) in the first frequency band, wherein the first scheduling grant is transmitted based on first LBT; and
   performing, by the first wireless communication device, a second LBT in the second frequency band, wherein the second scheduling grant is transmitted based on second LBT.

8. The method of claim 1, wherein the first communication signal and the second communication signal are associated with at least one of a network system information broadcast, a random access procedure, a network attachment procedure, or a paging procedure.

9. An apparatus comprising:
   a transceiver configured to:
      communicate, with a wireless communication device, an opportunistic frequency-switching configuration for switching between a first frequency band and a second frequency band shared by a first network operating entity and a second network operating entity, the opportunistic frequency-switching configuration indicating a first set of schedule monitoring periods in the first frequency band non-overlapping in time with a second set of schedule monitoring periods in the second frequency band; and communicate, with the wireless communication device, a first communication signal in the first frequency band during a first schedule monitoring period of the first set; and a processor configured to:
refrain from switching to the second frequency band for a second schedule monitoring period of the second set according to the opportunistic frequency-switching configuration in response to successfully communicating the first communication signal in the first frequency band, wherein the transceiver is further configured to:
switch from the first frequency band to the second frequency band for a third schedule monitoring period of the second set based on a failure to communicate with the wireless communication device in the first frequency band during a fourth schedule monitoring period of the first set; and communicate, with the wireless communication device after the switching, a second communication signal in the second frequency band during the third schedule monitoring period.

10. The apparatus of claim 9, wherein the first set of schedule monitoring periods interleaves with the second set of schedule monitoring periods in time.

11. The apparatus of claim 9,
wherein the processor is further configured to:
monitor for a first scheduling grant from the wireless communication device in the first frequency band during the first schedule monitoring period, wherein the first communication signal includes the first scheduling grant; and monitor, after the switching, for a second scheduling grant from the wireless communication device in the second frequency band during the third schedule monitoring period, wherein the second communication signal includes the second scheduling grant, wherein the second scheduling grant is monitored in response to a determination that there is no scheduling grant detected in the first frequency band during the fourth schedule monitoring period of the first set.

12. The apparatus of claim 9,
wherein the processor is further configured to determine whether the communicating the first communication signal is successful, wherein the transceiver configured to communicate the first communication signal is further configured to:
transmit, to the wireless communication device, a first scheduling grant in the first frequency band during the first schedule monitoring period, and wherein the transceiver configured to communicate the second communication signal is further configured to:
transmit, to the wireless communication device, a second scheduling grant in the second frequency band during the third schedule monitoring period when the communicating the first communication signal is determined to be unsuccessful.

13. The apparatus of claim 9,
a wherein the processor is further configured to:
perform a first listen-before-talk (LBT) in the first frequency band; and perform a second LBT in the second frequency band,
wherein the transceiver configured to communicate the first communication signal is further configured to:
transmit, to the wireless communication device, a first scheduling grant in the first frequency band during the first schedule monitoring period based on the first LBT, and wherein the transceiver configured to communicate the second communication signal is further configured to:
transmit, to the wireless communication device, a second scheduling grant in the second frequency band during the third schedule monitoring period based on the second LBT.

14. The apparatus of claim 9, wherein the first communication signal and the second communication signal are associated with at least one of a network system information broadcast, a random access procedure, a network attachment procedure, or a paging procedure.

15. A non-transitory computer-readable medium having program code recorded thereon, the program code comprising:
code for causing a first wireless communication device to communicate, with a second wireless communication device, an opportunistic frequency-switching configuration for switching between a first frequency band and a second frequency band shared by a first network operating entity and a second network operating entity, the opportunistic frequency-switching configuration indicating a first set of schedule monitoring periods in the first frequency band non-overlapping in time with a second set of schedule monitoring periods in the second frequency band;

code for causing the first wireless communication device to communicate, with the second wireless communication device, a first communication signal in the first frequency band during a first schedule monitoring period of the first set;

code for causing the first wireless communication device to refrain from switching to the second frequency band for a second schedule monitoring period of the second set according to the opportunistic frequency-switching configuration in response to successfully communicating the first communication signal in the first frequency band;

code for causing the first wireless communication device to switch from the first frequency band to the second frequency band for a third schedule monitoring period of the second set based on a failure to communicate with the second wireless communication device in the first frequency band during a fourth schedule monitoring period of the first set; and code for causing the first wireless communication device to communicate, with the second wireless communication device after the switching, a second communication signal in the second frequency band during the third schedule monitoring period.

16. The non-transitory computer-readable medium of claim 15, wherein the first set of schedule monitoring periods interleaves with the second set of schedule monitoring periods in time.

17. The non-transitory computer-readable medium of claim 15, further comprising:
code for causing the first wireless communication device to monitor for a first scheduling grant from the second wireless communication device in the first frequency band during the first schedule monitoring period, wherein the first communication signal includes the first scheduling grant; and code for causing the first wireless communication device to monitor, after the switching, for a second scheduling grant from the second wireless communication device in the second frequency band during the third schedule monitoring period, wherein the second communication signal includes the second scheduling grant, wherein the second scheduling grant is monitored in response to a determination that there is no scheduling grant detected in the first frequency band during the fourth schedule monitoring period of the first set.

18. The non-transitory computer-readable medium of claim 15, further comprising:
code for causing the first wireless communication device to determine whether the communicating the first communication signal is successful,
wherein the code for causing the first wireless communication device to communicate the first communication signal is further configured to:
transmit, to the second wireless communication device, a first scheduling grant in the first frequency band during the first schedule monitoring period, and
wherein the code for causing the first wireless communication device to communicate the second communication signal is further configured to:
transmit, to the second wireless communication device, a second scheduling grant in the second frequency band during the third schedule monitoring period when the communicating the first communication signal is determined to be unsuccessful.

19. The non-transitory computer-readable medium of claim 15, further comprising:
code for causing the first wireless communication device to perform a first listen-before-talk (LBT) in the first frequency band; and
code for causing the first wireless communication device to perform a second LBT in the second frequency band,
wherein the code for causing the first wireless communication device to communicate the first communication signal is further configured to:
transmit, to the second wireless communication device, a first scheduling grant in the first frequency band during the first schedule monitoring period based on the first LBT, and
wherein the code for causing the first wireless communication device to communicate the second communication signal is further configured to:
transmit, to the second wireless communication device, a second scheduling grant in the second frequency band during the third schedule monitoring period based on the second LB T.

20. The non-transitory computer-readable medium of claim 15, wherein the first communication signal and the second communication signal are associated with at least one of a network system information broadcast, a random access procedure, a network attachment procedure, or a paging procedure.

21. An apparatus comprising:
means for communicating, with a second wireless communication device, an opportunistic frequency-switching configuration for switching between a first frequency band and a second frequency band shared by a first network operating entity and a second network operating entity, the opportunistic frequency-switching configuration indicating a first set of schedule monitoring periods in the first frequency band non-overlapping in time with a second set of schedule monitoring periods in the second frequency band;
means for communicating, with the second wireless communication device, a first communication signal in the first frequency band during a first schedule monitoring period of the first set;
means for refraining from switching to the second frequency band for a second schedule monitoring period of the second set according to the opportunistic frequency-switching configuration in response to successfully communicating the first communication signal in the first frequency band;
means for switching from the first frequency band to the second frequency band for a third schedule monitoring period of the second set based on a failure to communicate with the second wireless communication device in the first frequency band during a fourth schedule monitoring period of the first set; and
means for communicating, with the second wireless communication device after the switching, a second communication signal in the second frequency band during the third schedule monitoring period.

22. The apparatus of claim 21, wherein the first set of schedule monitoring periods interleaves with the second set of schedule monitoring periods in time.

23. The apparatus of claim 21, further comprising:
means for monitoring for a first scheduling grant from the second wireless communication device in the first frequency band during the first schedule monitoring period, wherein the first communication signal includes the first scheduling grant; and
means for monitoring, after the switching, for a second scheduling grant from the second wireless communication device in the second frequency band during the third schedule monitoring period, wherein the second communication signal includes the second scheduling grant,
wherein the second scheduling grant is monitored in response to a determination that there is no scheduling grant detected in the first frequency band during the fourth schedule monitoring period of the first set.

24. The apparatus of claim 21, further comprising:
means for determining whether the communicating the first communication signal is successful,
wherein the means for communicating the first communication signal is further configured to:
transmit, to the second wireless communication device, a first scheduling grant in the first frequency band during the first schedule monitoring period, and
wherein the means for communicating the second communication signal is further configured to:
transmit, to the second wireless communication device, a second scheduling grant in the second frequency band during the third schedule monitoring period when the communicating the first communication signal is determined to be unsuccessful.

25. The apparatus of claim 21, further comprising:
means for performing a first listen-before-talk (LBT) in the first frequency band; and
means for performing a second LBT in the second frequency band,
wherein the means for communicating the first communication signal is further configured to:
transmit, to the second wireless communication device, a first scheduling grant in the first frequency band during the first schedule monitoring period based on the first LBT, and wherein the means for communicating the second communication signal is further configured to:
transmit, to the second wireless communication device, a second scheduling grant in the second frequency band during the third schedule monitoring period based on the second LBT.

26. The apparatus of claim 21, wherein the first communication signal and the second communication signal are associated with at least one of a network system information broadcast, a random access procedure, a network attachment procedure, or a paging procedure.

* * * * *